United States Patent
Li et al.

(10) Patent No.: US 9,830,188 B2
(45) Date of Patent: Nov. 28, 2017

(54) METHODS AND SYSTEMS FOR CALCULATING STATISTICAL QUANTITIES IN A COMPUTING ENVIRONMENT

(71) Applicant: VMware, Inc., Palo Alto, CA (US)

(72) Inventors: Junwei Li, Atanta, GA (US); Jay A. Patel, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 177 days.

(21) Appl. No.: 14/303,449

(22) Filed: Jun. 12, 2014

(65) Prior Publication Data

US 2015/0363232 A1    Dec. 17, 2015

(51) Int. Cl.
*G06F 9/48* (2006.01)
*G06F 9/50* (2006.01)
*G06F 11/30* (2006.01)
*G06F 11/34* (2006.01)

(52) U.S. Cl.
CPC .......... *G06F 9/5011* (2013.01); *G06F 9/4881* (2013.01); *G06F 11/30* (2013.01); *G06F 11/3006* (2013.01); *G06F 11/3072* (2013.01); *G06F 11/3409* (2013.01); *G06F 11/3452* (2013.01)

(58) Field of Classification Search
CPC .................................................... G06F 9/5011
USPC .................................................. 717/101–108
See application file for complete search history.

(56) References Cited

U.S. PATENT DOCUMENTS

| | | | | |
|---|---|---|---|---|
| 6,654,954 | B1* | 11/2003 | Hicks | G06F 9/45516 707/999.202 |
| 7,003,726 | B2* | 2/2006 | Walker | G06F 17/3056 707/E17.005 |
| 8,589,931 | B2* | 11/2013 | Barsness | G06F 1/3203 709/223 |
| 2007/0240160 | A1* | 10/2007 | Paterson-Jones | G06F 9/5055 718/104 |
| 2008/0082374 | A1* | 4/2008 | Kennis | G06F 17/30569 705/7.36 |

(Continued)

OTHER PUBLICATIONS

Buyya, R., Yeo, C. S., Venugopal, S., Broberg, J., & Brandic, I. (2009). Cloud computing and emerging IT platforms: Vision, hype, and reality for delivering computing as the 5th utility. Future Generation computer systems, 25(6),pp. 599-616.*

(Continued)

*Primary Examiner* — Satish Rampuria

(57) ABSTRACT

This disclosure is directed to methods and systems for calculating statistical quantities of computational resources used by distributed data sources in a computing environment. In one aspect, a master node receives a query regarding use of computational resources used by distributed data sources of a computing environment. The data sources generate metric data that represents use of the computational resources and distribute the metric data to two or more worker nodes. The master node directs each worker node to generate worker-node data that represents the metric data received by each of the worker nodes and each worker node sends worker-node data to the master node. The master node receives the worker-node data and calculates a master-data structure based on the worker-node data, which may be used to estimate percentiles of the metric data in response to the query.

30 Claims, 20 Drawing Sheets

(56) References Cited

U.S. PATENT DOCUMENTS

| | | | |
|---|---|---|---|
| 2009/0029692 A1* | 1/2009 | Radermacher | H04M 3/42127 455/418 |
| 2011/0209156 A1* | 8/2011 | Box | G06F 9/5077 718/104 |
| 2012/0003728 A1* | 1/2012 | Lanoue | A01G 1/00 435/288.7 |
| 2014/0245298 A1* | 8/2014 | Zhou | G06F 9/455 718/1 |

OTHER PUBLICATIONS

Buyya, Rajkumar, Anton Beloglazov, and Jemal Abawajy. "Energy-efficient management of data center resources for cloud computing: a vision, architectural elements, and open challenges." arXiv preprint arXiv:1006.0308 (2010), pp. 1-12.*

Chase, J. S., Anderson, D. C., Thakar, P. N., Vandat, A. M., & Doyle, R. P. (Oct. 2001). Managing energy and server resources in hosting centers. In ACM SIGOPS Operating Systems Review (vol. 35, No. 5, pp. 103-116). ACM.*

Smit, Michael, Bradley Simmons, and Marin Litoiu. "Distributed, application-level monitoring for heterogeneous clouds using stream processing." Future Generation Computer Systems 29.8 (2013): pp. 1-17.*

* cited by examiner

METHODS AND SYSTEMS FOR CALCULATING STATISTICAL QUANTITIES IN A COMPUTING ENVIRONMENT

TECHNICAL FIELD

This disclosure is directed to calculating statistical quantities based on metric values generated in a computing environment.

BACKGROUND

In recent years, the number of enterprises that rely on data centers to store, manage, and disseminate their data has increased. Enterprises purchase information technology ("IT") services from IT service providers that maintain the data centers in order to decrease time to market and cut costs by eliminating a heavy investment in IT and operating expenses. A typical data center is implemented with logical machines ("LM") that include physical machines ("PMs"), such as servers, storage, network, and firewall appliances, and virtual machines ("VMs") that run on the PMs. VMs are software emulations of PMs that may be moved around and scaled up or down as needed without affecting a user's experience. VMs enable an IT service provider to allocate PMs of a data center to satisfy high-demand periods for one enterprise's software and, when demand decreases, the same PMs may be reallocated to run software used by other enterprises. As a result, VMs enable IT service providers to maximize use of data-center hardware and lower the costs of IT services purchased by enterprises.

In typical data centers, LMs generate metric data that represents usage of computational resources, such as processors, memory, and network connections. For example, the PMs and VMs generate metrics, such as CPU usage, memory usage, volume of network traffic sent or received, or a change in usage of a particular resource. The metric data is often sent from the LMs to a particular PM dedicated to storing the metric data and generating statistical quantities that are used for performance monitoring, system diagnosis, troubleshooting, and billing. Typically, precise calculation of many statistical quantities necessitates collection of large quantities of metric data over time. However, data centers that generate big data also generate large quantities of metric data that fills most, if not all, of the finite memory of the dedicated PM, which creates a storage bottleneck in calculating useful statistical quantities.

SUMMARY

This disclosure is directed to methods and systems for calculating statistical quantities of computational resources used by distributed data sources in a computing environment. In one aspect, a master node receives a query regarding use of computational resources used by distributed data sources of a computing environment. The query may be generated by a user via a graphical user interface or programmatically via a script, executable program. The data sources generate metric data that represents use of the computational resources and distribute the metric data to one or more worker nodes. In response to the query, the master node directs each worker node to generate worker-node data that represents the metric data received by each of the worker nodes and each worker node sends worker-node data to the master node. The master node receives the worker-node data and calculates a master-data structure based on the worker-node data. The master-data structure represents a distribution of the full set of metric data generated by the data sources and is used to estimate statistical quantities in response to the query, such as $25^{th}$, $75^{th}$, and $95^{th}$ percentile and median.

DETAILED DESCRIPTION

Figure 1A:
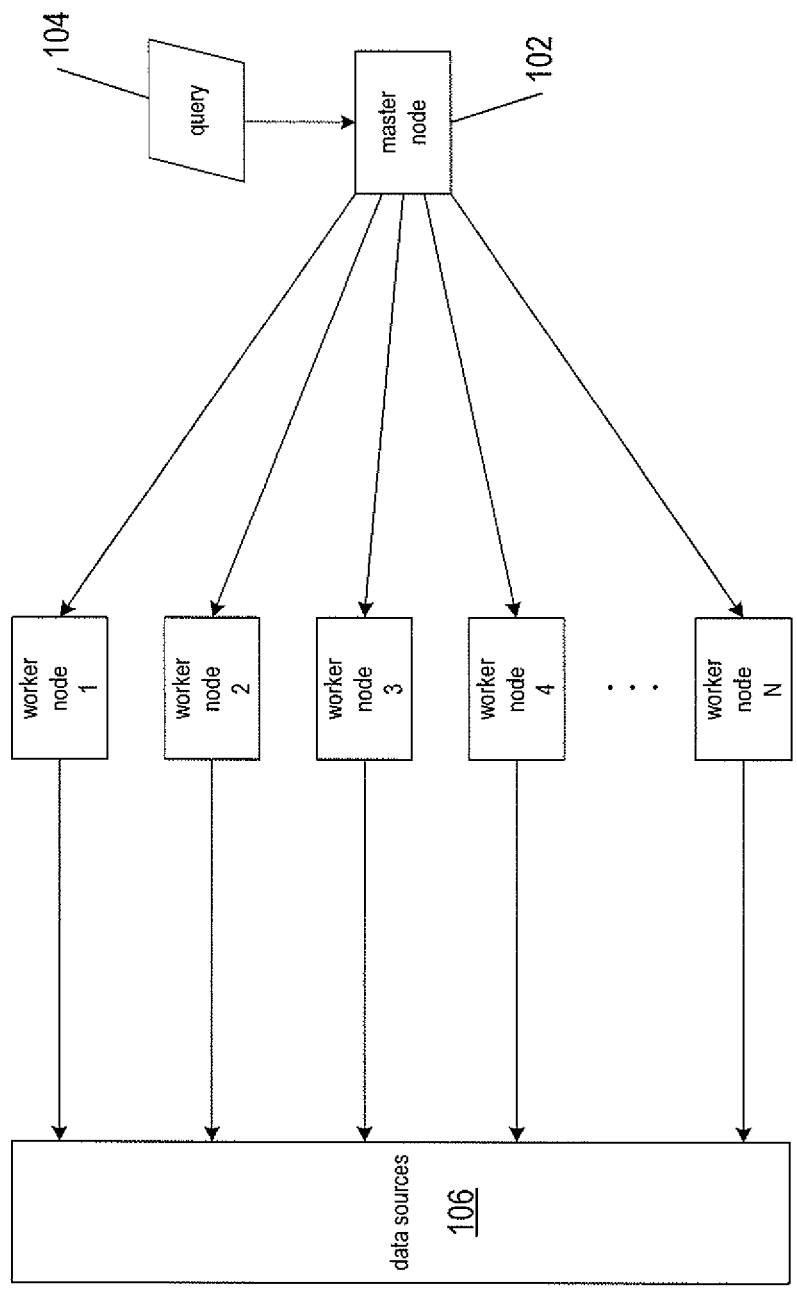
FIGS. 1A-1B show an example system for efficiently calculating a data structure of a particular set of computational resources in a computational environment.
Figure 1B:
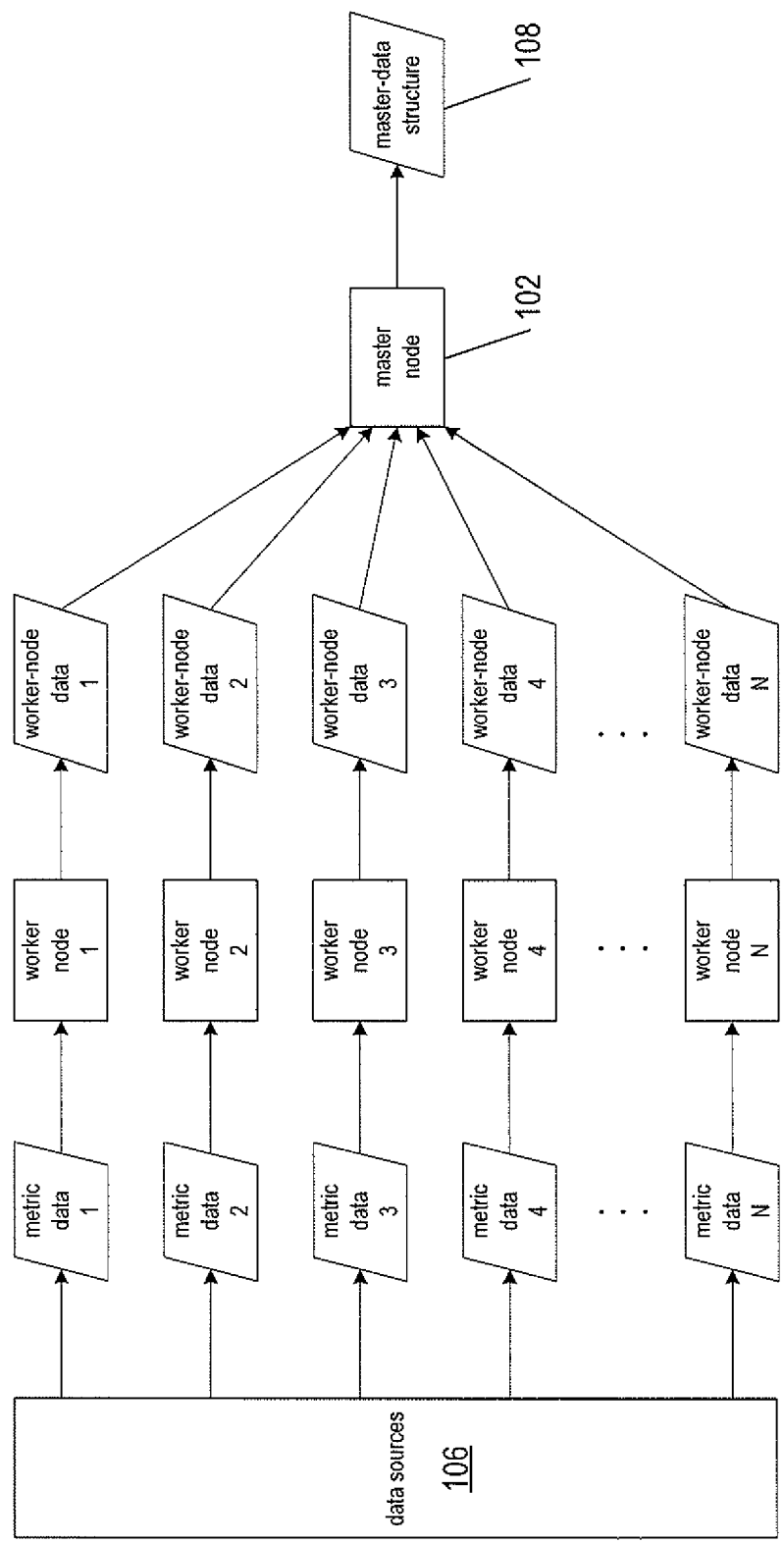

FIGS. 1A-1B show an example system for efficiently calculating a data structure of a particular set of computational resources in a computational environment. The computational environment can be a data center or two or more geographically distributed data centers, and the computational resources can be any set of physical or virtual resources, such as processors, memory, and network connections. The data structure may be used to calculate statistical quantities used to monitor computational performance, diagnosis problems, troubleshoot, and generate information for billing. The system includes a master node 102 and N worker nodes indexed 1 through N. The master node 102 and worker nodes may be executed on separate LMs. An LM can be a physical machine ("PM"), virtual machine ("VM"), or any other computing machine, such as a network router or a firewall appliance. For example, in one implementation, the master node 102 and worker nodes may be executed on N+1 separate PMs. In a second implementation, the master node 102 and worker nodes may be executed on N+1 separate VMs. In a third implementation, the N worker nodes may be executed on N separate PMs and the master node 102 may be executed on a VM that runs on one of the NPMs.

As shown in FIG. 1A, the master node 102 receives a query 104 regarding usage of a particular type of computational resource over a period of time. For example, the master node 102 may receive a query that asks about virtual, or physical, CPU usage center over a period of time. In another example, the master node 102 may receive a query asking about physical memory storage within a data center over a period of time. The period of time may be any period of time, such as an hour, a day, a week, or longer. The query 104 may be generated by a by a user or generated by an automated script program. The master node 102 sends the query to the N worker nodes. The N worker nodes are in communication with data sources 106, such as LMs, that generate metric data regarding usage of the computational resources.

As shown in FIG. 1B, the N worker nodes return metric data to the master node 102 in response to the query 104. The metric data stored in the worker nodes may have been pre-collected from the data sources 106 independent of the query 104. For example, the data sources 106 may send metric data to the N worker nodes as soon as the data sources 106 have new metric data, or the data sources 106 send metric data to the worker nodes based on schedule. Alternatively, the N worker nodes request metric data from associated data sources 106 in response to the query 104. The metric data may be CPU usage, memory usage, volume of network traffic sent or received, or changes in usage of a particular resource. The data sources 106 generate metric data that is partitioned into unique metric data subsets indexed 1 through N and each subset is sent to one of the worker nodes. The metric data sent from the data sources 106 to the worker nodes may be partitioned using manual partitioning or using a load balancer. With manual partitioning, particular data sources are assigned to each worker node by a user. For example, a number of servers in a data center only send metric data to worker node 1. On the other hand, the load balancer may be used to evenly distribute the subsets of metric data to the worker nodes, or the load balancer may check each worker node's memory and distribute the subsets of metric data according to each worker node available memory. Each worker node receives and stores a unique subset of the metric data generated by the data sources 106 and generates corresponding worker-node data indexed 1 through N in response to the request from the master node 102. For example, each worker node generates worker-node data based on already stored metric data over the time period specified in the query 104 sent to the master node 102. The master node 102 receives worker-node data from the N worker nodes and aggregates the worker-node data to generate a master-data structure 108 which is a frequency distribution of the full set of metric data output from the data sources 106. The master-data structure 108 may be used by the master node 102, or another physical or virtual computer system, to calculate statistical quantities, such as estimated percentiles of the metric data.

The number N of worker nodes may be scaled up or down depending on changes in the volume of metric data output from the data sources 106. For example, when the volume of metric data output from the data sources 106 is below a threshold, a single worker node located on a single LM may be used to generate the master-data structure 108 and statistical quantities in response to the query 104. As the volume of metric data output from the data sources 106 increases, one or more worker nodes and the master node 102 are formed as shown in FIGS. 1A-1B. The number of worker nodes increases as the volume of metric data output from the data sources 106 increases. On the other hand, as the volume of metric data output from the data sources 106 decreases, the number of worker nodes decreases. The number of worker nodes may continue to decrease until a single worker node located on a single LM is able to generate the master-data structure 108 and statistical quantities in response to the query 104 when the volume of metric data is below the threshold.

It should be noted at the onset that metric data, worker-node data, and a data structure are not, in any sense, abstract or intangible. Instead, the data is necessarily digitally encoded and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems on electronically or magnetically stored data, with the results of the data processing and data analysis digitally encoded and stored in one or more tangible, physical, data-storage devices and media.

Figure 2:
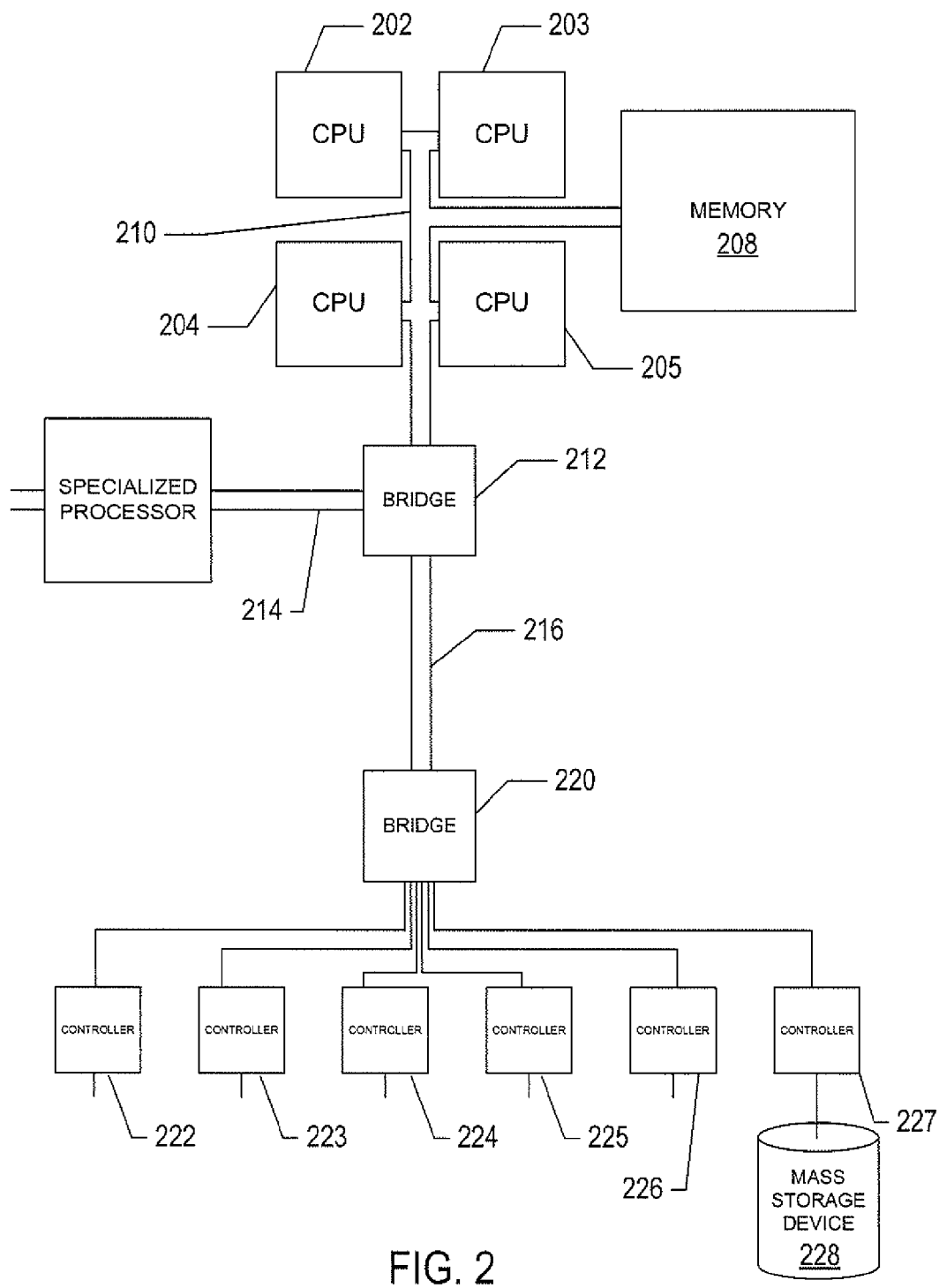
FIG. 2 shows an example of a generalized computer system that executes efficient methods for generating worker-node data and calculating statistical quantities.

FIG. 2 shows an example of a generalized computer system that executes efficient methods for generating worker-node data or aggregating worker-node data to calculate statistical quantities, such as percentile estimates, and therefore represents a data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. The busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of computer-readable media, such as computer-readable medium 228, electronic displays, input devices, and other such components, sub-components, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 228 is a data-storage device, including electronic memory, optical or magnetic disk drive, USB drive, flash memory and other such data-storage device. The computer-readable medium 228 can be used to store machine-readable instructions that encode the computational methods described below and can be used to store encoded data, during store operations, and from which encoded data can be retrieved, during read operations, by computer systems, data-storage systems, and peripheral devices.

Returning to FIG. 1B, each worker node has finite memory with a memory bound denoted by B for storing metric data sent from the data sources 106 and the memory bounds of the worker nodes may vary. Worker-node data sent to the master node 102 from a worker node can be either the metric data received by the worker node or a data structure of the metric data received by the worker node, depending on whether or not the size of the subset of metric data is greater than the memory bound of the worker node. When the metric data sent to a worker node is less than or equal to the memory bound B, the worker-node data sent to the master node 102 is the metric data the worker node received. On the other hand, when the metric data sent to a worker node is greater than the memory bound B, the worker node generates a data structure of the metric data, which is a frequency distribution of the metric data sent to the worker node. The data structure is another form of worker-node data sent to the master node 102.

Figure 3:
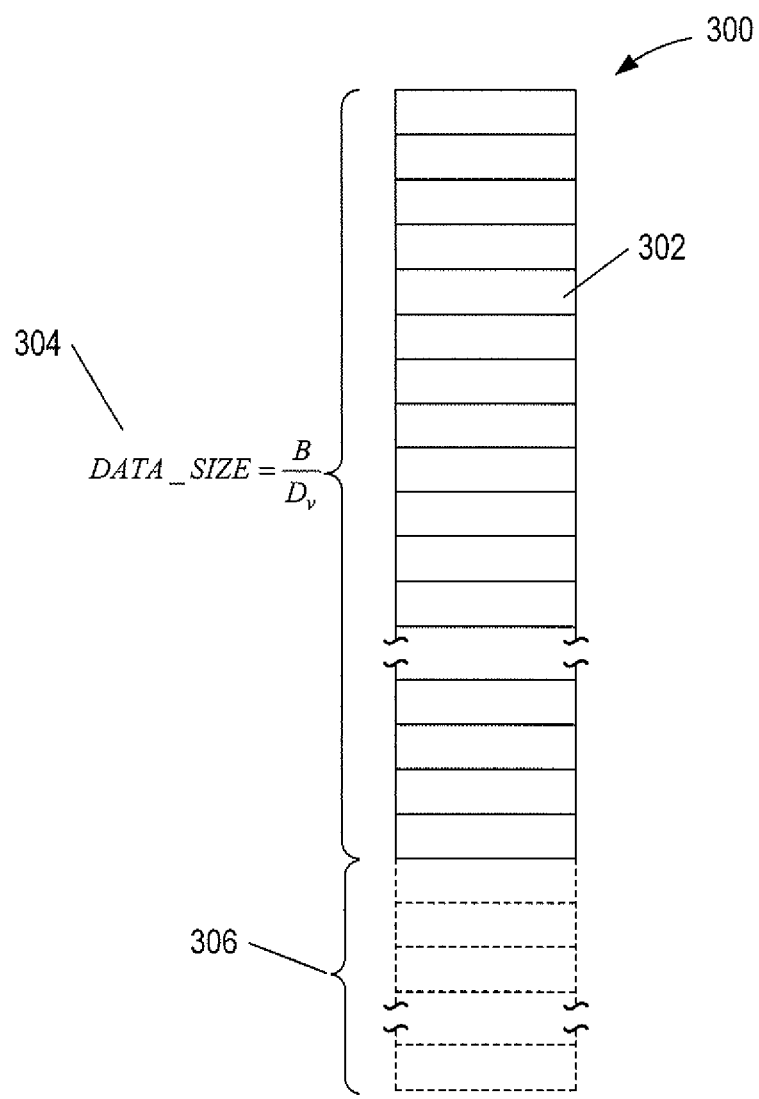
FIG. 3 shows an example worker-node array.

FIG. 3 shows an example of a worker-node array 300. The array 300 is represented by a column of boxes, such as box 302, with each box representing an array element. Each of the array elements is able to store a metric value with bit size denoted by $D_v$, and the data size 304 or number of array elements in the array 300 is given by $B/D_v$. When the number of metric values is less than or equal to the DATA_SIZE 304, the worker node stores the metric values in the array 300 and sends the metric values to the master node. On the other hand, as the worker node continues to receive metric data and determines the number of metric values will be greater than the DATA_SIZE 304, as represented by dashed boxes 306, the worker node converts the metric data to a data structure, which is a frequency distribution of the metric data and sends the data structure to the master node. Generating a data structure that represents the frequency distribution of the metric data sent to a worker node is described below with reference FIGS. 4-9.

Figure 4:
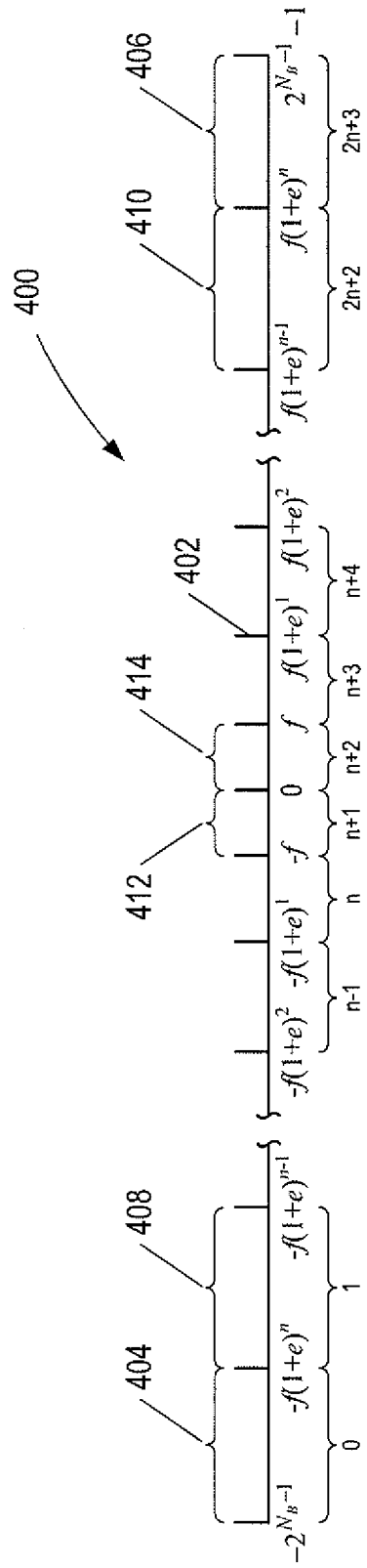
FIG. 4 shows an example of data-structure intervals.

The data structures generated by the worker nodes to represent frequency distributions of unique subsets of metric data and the master-data structure ultimately generated by the master node to represent an overall frequency distribution of the metric data are based on the same set of data-structure intervals. FIG. 4 shows an example of data-structure intervals 400. The data-structure intervals 400 range from $-2^{N_B-1}$ to $2^{N_B-1}-1$, where $N_B$ represents the number of bits used to represent the metric data. For example, a 64-bit block of computer memory may be used to encode a range of $2^{64}$ numerical values between $-2^{63}$ to $2^{63}-1$ with approximately 19 decimal digits. In the example of FIG. 4, the data-structure intervals 400 are formed by partitioning the range of values between $-2^{N_B-1}$ to $2^{N_B-1}-1$ into 2n+4 intervals separated by vertical lines, such as vertical line 402, where n is a positive integer. In the example of FIG. 4, the data-structure intervals 400 are defined as follows. For positive numbers, the data-structure intervals are given by $$[f(1+e)^i, f(1+e)^{i+1}) \qquad (1a)$$

and, for negative numbers, the data-structure intervals are given by $$[-f(1+e)^{i+1}, -f(1+e)^i) \qquad (1b)$$

where i is an integer that ranges from $0 < i < n$;
f is a small fraction greater than zero; and
e is a percentage value.
Negative-end interval 404 is given by $$[-2^{N_B-1}, -f(1+e)^n) \qquad (2)$$

and positive-end interval 406 is given by $$[f(1+e)^n, 2^{N_B-1}-1] \qquad (3)$$

Intervals with values between $-f(1+e)^n$ and zero are given by $$[-f(1+e)^n, -f(1+e)^{n-1}), \ldots, [-f(1+e)^i, -f(1+e)^{i-1}), \ldots, [-f, 0) \qquad (4)$$

and intervals with values between 0 and $f(1+e)^n$ are given by $$[0,f), \ldots, [f(1+e)^{j-1}, f(1+e)^j), \ldots, [f(1+e)^{n-1}, f(1+e)^n) \qquad (5)$$

The fraction f and percentage e are user selected values. For example, data-structure intervals that partition a range of values from $-4.56 \times 10^{14}$ to $4.56 \times 10^{14}$ are formed with a percentage value e equal to 1% and a fraction f equal to $10^{-7}$. This range for data-structure intervals occupies less than 40 K bytes of memory and is a range of values that typical metric values lie within.

In the example of FIG. 4, each of the 2n+4 intervals is assigned an index. For example, negative-end interval 404 is assigned the index 0 and negative interval 408 is assigned the index 1. At the opposite end of the data-structure intervals 400, positive interval 410 is assigned the index 2n+2 and positive-end interval 406 is assigned the index 2n+3.

The data-structure intervals 400 cover metric values that may be positive and negative. For example, metric values that represent increased and decreased usage of a computational resource, such as changes in CPU usage or memory, can be positive and negative. On the other hand, in certain applications, the metric values are non-negative. For example, CPU usage and memory metric values are non-negative. In cases where the metric values output from the data source are non-negative, the data-structure intervals may range from 0 to $2^{N_B}$, the intervals given Equation (5) may be used with positive-end interval $[f(e+1)^n, 2^{N_B})$, and the intervals may be indexed from 0 to n+2. Likewise, in cases where the metric values output from the data source are non-positive, the data-structure intervals may range from $-2^{N_B}$ to 0, the intervals given Equation (4) may be used with negative-end interval $[-2^{N_B}-f(e+1)^n,]$, and the intervals may be indexed from 0 to n+2.

The data-structure intervals 400 are classified as either "special intervals" or "regular intervals." There are four special intervals and the remaining intervals are regular intervals. The four special intervals are the negative-end interval 404, positive-end interval 406, and the two intervals [-f, 0) 312 and [0, f) 314. A largest negative metric value in the negative-end interval 304 is referred to as INTERVAL_MIN, and a largest positive metric value in the positive-end interval 306 is referred to as INTERVAL_MAX. If a subsequently received metric value lies in the positive-end special interval and is greater than INTERVAL_MAX, INTERVAL_MAX is assigned the value of the subsequent metric value. If a subsequently received metric value lies in the negative-end special interval and is less than INTERVAL_MIN, INTERVAL_MIN is assigned the value of the subsequent metric value.

Figure 5:
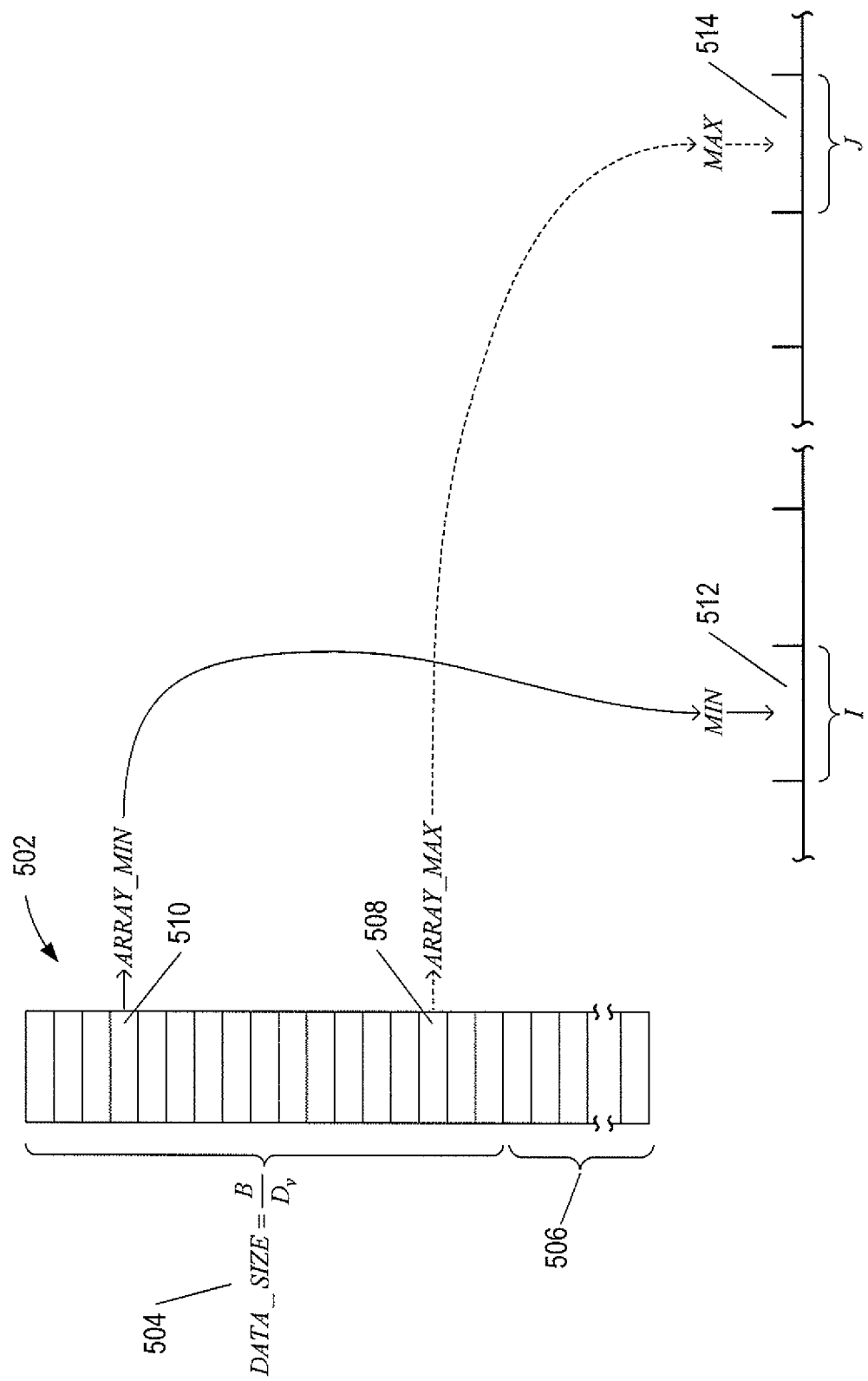
FIG. 5 shows an example of metric data received by a worker node.

FIG. 5 shows an example of metric data received by a worker node in which the metric data exceeds the memory bound of the worker node. The metric data received by the worker node fills an array 502 with worker node data size 504. As additional metric data 506 is input to the worker node, the worker node identifies a maximum-array value 508 denoted by ARRAY_MAX stored in the array 502 and a minimum-array value 510 denoted by ARRAY_MIN stored in the array 502. The worker node then estimates a minimum-metric value for the full set of metric data to be received by the worker node as follows:

$$\text{MIN} = \begin{cases} \text{ARRAY\_MIN} \times 100, & \text{when ARRAY\_MIN} < 0 \\ \text{ARRAY\_MIN}/100, & \text{when ARRAY\_MIN} \geq 0 \end{cases} \quad (6)$$

The worker node also estimates the maximum-metric value for the full set of metric data to be received by the worker node as follows:

$$\text{MAX} = \begin{cases} \text{ARRAY\_MAX} \times 100, & \text{when ARRAY\_MAX} < 0 \\ \text{ARRAY\_MAX}/100, & \text{when ARRAY\_MAX} \geq 0 \end{cases} \quad (7)$$

The worker node then identifies two intervals and associated interval indices of the data structure that contains the estimated minimum MIN and estimated maximum MAX. For example, as shown in FIG. 5, the estimated minimum lies in the interval 512 with interval index I and the estimated maximum lies in the interval 514 with interval index J.

After the interval indices I and J for the corresponding estimated minimum MIN and estimated maximum MAX have been determined, an interval degree is calculated for the data structure:

$$D = \text{round}\left(\log_2\left(\frac{K}{J-I+1}\right)\right) \quad (8)$$

where K is the number of data-structure intervals; and
J−I+1 is the number of data-structures intervals between and including the Ith and Jth data-structure intervals.

For example, the number of intervals in the data-structure intervals 400 is K=2n+4. The "round" function represents round logarithm values down to the smallest non-negative integer value.

Figure 6:
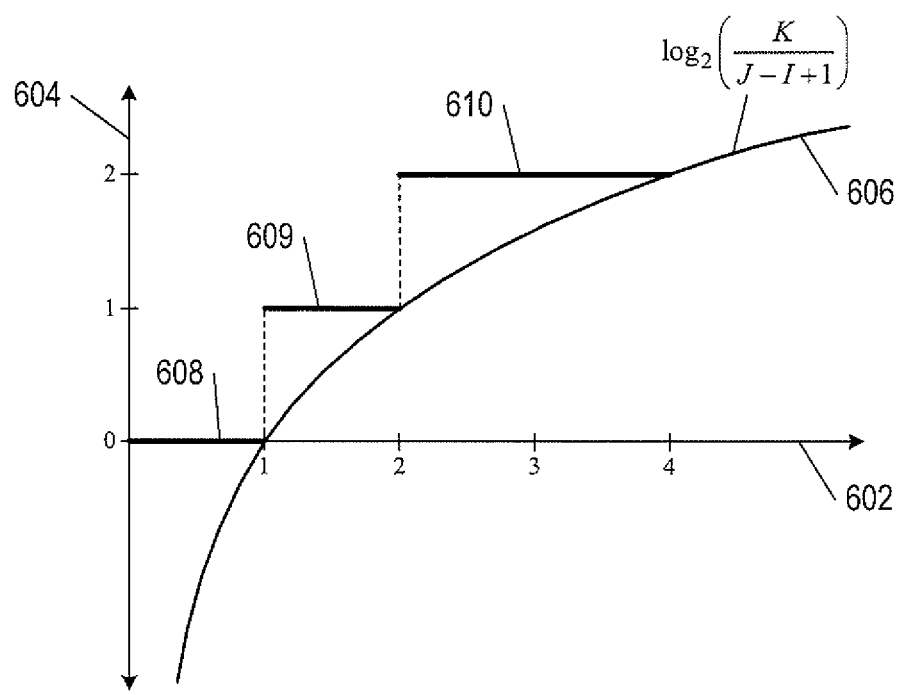
FIG. 6 shows a plot of a logarithm function and interval degree.

FIG. 6 shows a plot of a $\log_2$ function and interval degree D of Equation (8). Horizontal axis 602 represents the $\log_2$ function domain, vertical axis 604 represents the $\log_2$ function range, and curve 606 represents $\log_2$ function values. The interval degree D is represented by a step function composed of a series of steps 608-610. For example, when values for the logarithm 606 are negative, which corresponds to $0 < K/(J-I+1) \leq 1$, the interval degree is D=0. When values for the logarithm 606 are between 0 and 1, which corresponds to $1 < K/(J-I+1) \leq 2$, the interval degree is D=1. When values for the logarithm 606 are between 1 and 2, which corresponds to $2 < K/(J-I+1) \leq 4$, the interval degree is D=2.

The interval degree is used to calculate the number of subintervals the intervals of the data structure between and including the intervals I and J are to be divided into:

$$\text{SUBINTERVALS} = 2^D \quad (9)$$

When the interval degree is D=0, the intervals of the data structure are not divided. However, when the interval degree D≥1, each interval of the data structure between and including I and J is divided into $2^D$ subintervals and each subinterval is $\frac{1}{2}^D$ the length of the interval.

Figure 7:
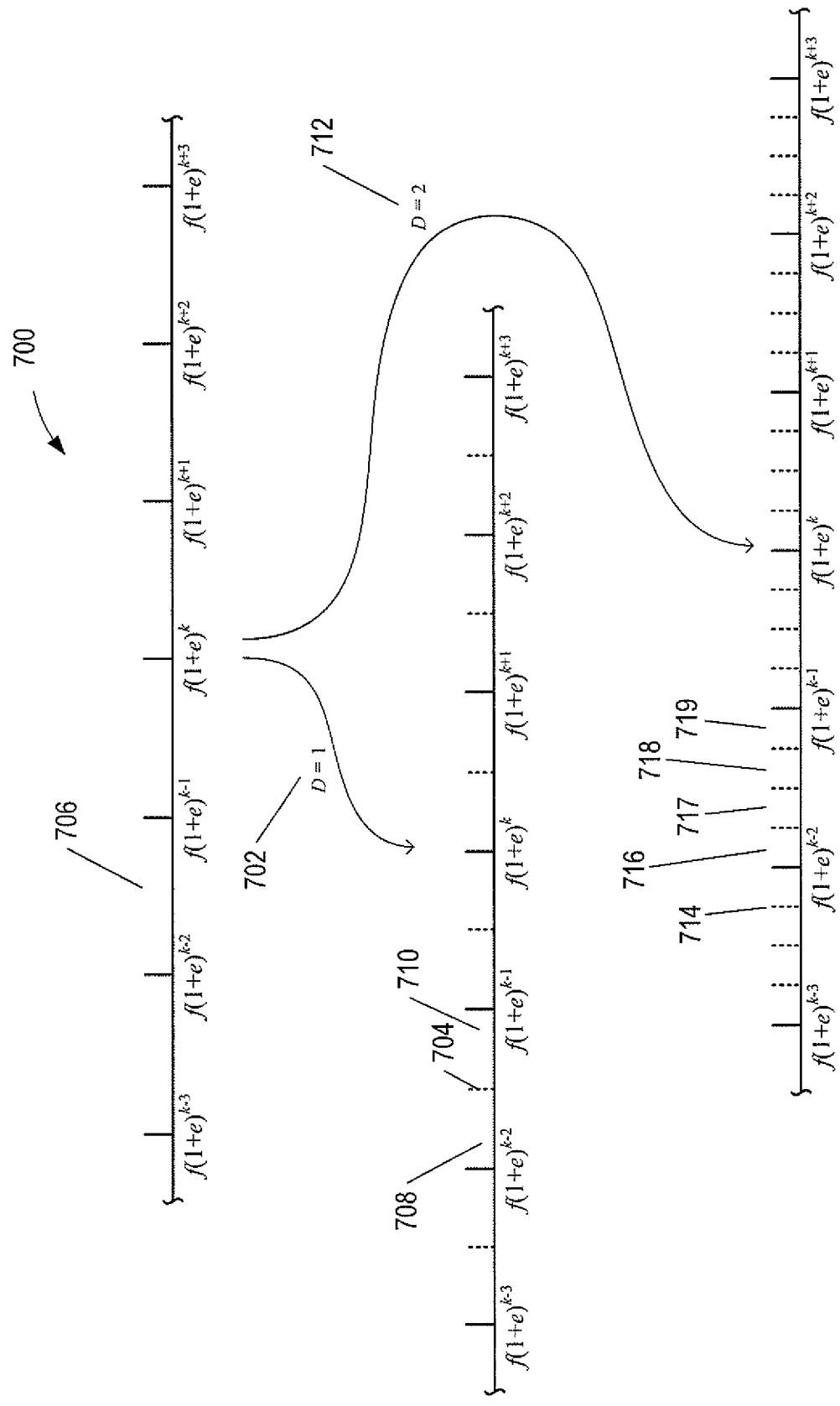
FIG. 7 shows as example of six consecutive data-structure intervals.

FIG. 7 shows as example of six consecutive data-structure intervals 700 of a data structure. When the interval degree is D=0, the six data-structure intervals are not divided into subintervals. When the interval degree is D=1 702, each of the six data-structure intervals is divided into 2 (i.e., $2^1$) equally sized subintervals called half-length subintervals. Dashed lines, such as dashed line 704, represent midpoints of the data-structure intervals which divide each of the six data-structure intervals into two equally sized half-length subintervals. For example, data-structure interval 706 is divided into two equally sized half-length subintervals 708 and 710. When the interval degree is D=2 712, each of the six data-structure intervals is divided into 4 (i.e., $2^2$) equally sized subintervals called quarter-length subintervals. Dashed lines, such as dashed line 714, represent points along which the intervals are each divided into four equally sized quarter-length subintervals. For example, data-structure interval 706 is divided into four equally sized quarter-length subintervals 716-719.

After data-structure intervals or subintervals have been determined, each data-structure interval or subinterval has an associated count that is initialized to zero. The worker node determines which intervals or subintervals the metric values are in and increments the corresponding count for each metric value that lies in the interval or subinterval. In other words, the metric values of the metric data sent to the worker node that lie in each data-structure interval or subinterval are counted to generate a data structure.

Figure 8:
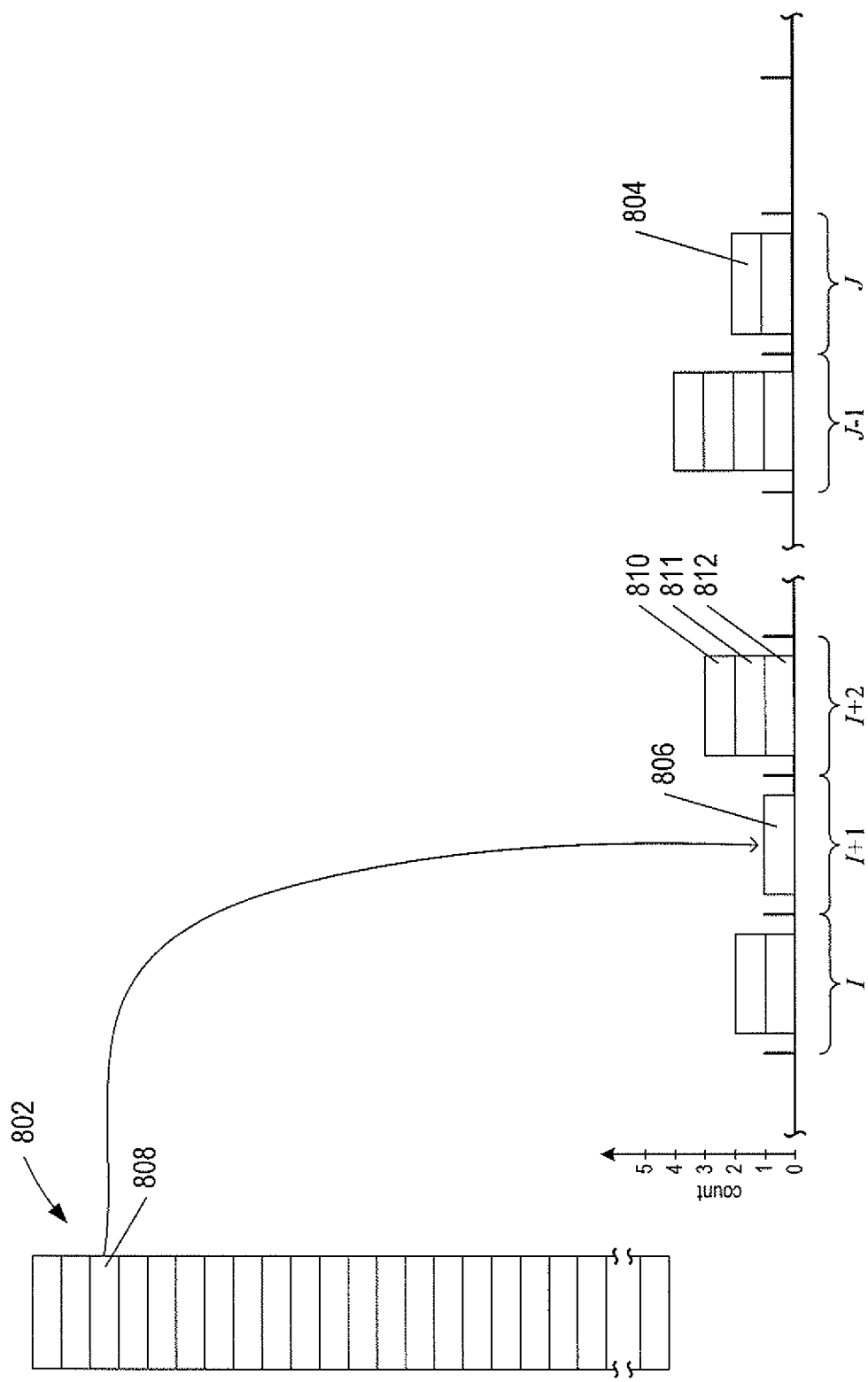
FIG. 8 shows an example array of metric data sent to a worker node and associated data-structure intervals.

FIG. 8 shows an example array 802 of metric data sent to a worker node and data-structure intervals surrounding Ith and Jth data-structure intervals. Prior to counting the number of metric values that lie within each data-structure interval, the count associated with each data-structure interval is assigned the value zero. Blocks, such as block 804, each represent a count of 1 added to a count associated with each data-structure interval when a metric value of the array 802 lies within a data-structure interval. For example, the I+1 interval has an initial count set to zero. Block 806 represents a count of 1 added to the count for the data-structure interval I+1 because corresponding metric value stored in array element 808 lies in the interval I+1. Data-structure interval I+2 has three blocks 810-812, which represents three metric values in the array 802 that lie in the interval I+2.

The counts for data-structure subintervals are incremented in the same manner as the counts are incremented for data-structure intervals. In other words, when a metric values lies within a data-structure subinterval, the count associated with the subinterval is incremented. However, when a metric value lies in a data-structure subinterval or interval that is outside the Ith to Jth data-structure intervals, the data-structure subintervals are downgraded to the data-structure intervals. In downgrading data-structure subintervals to data-structure intervals, the counts of subintervals that partition an interval are summed to give a count for the interval.

Figure 9:
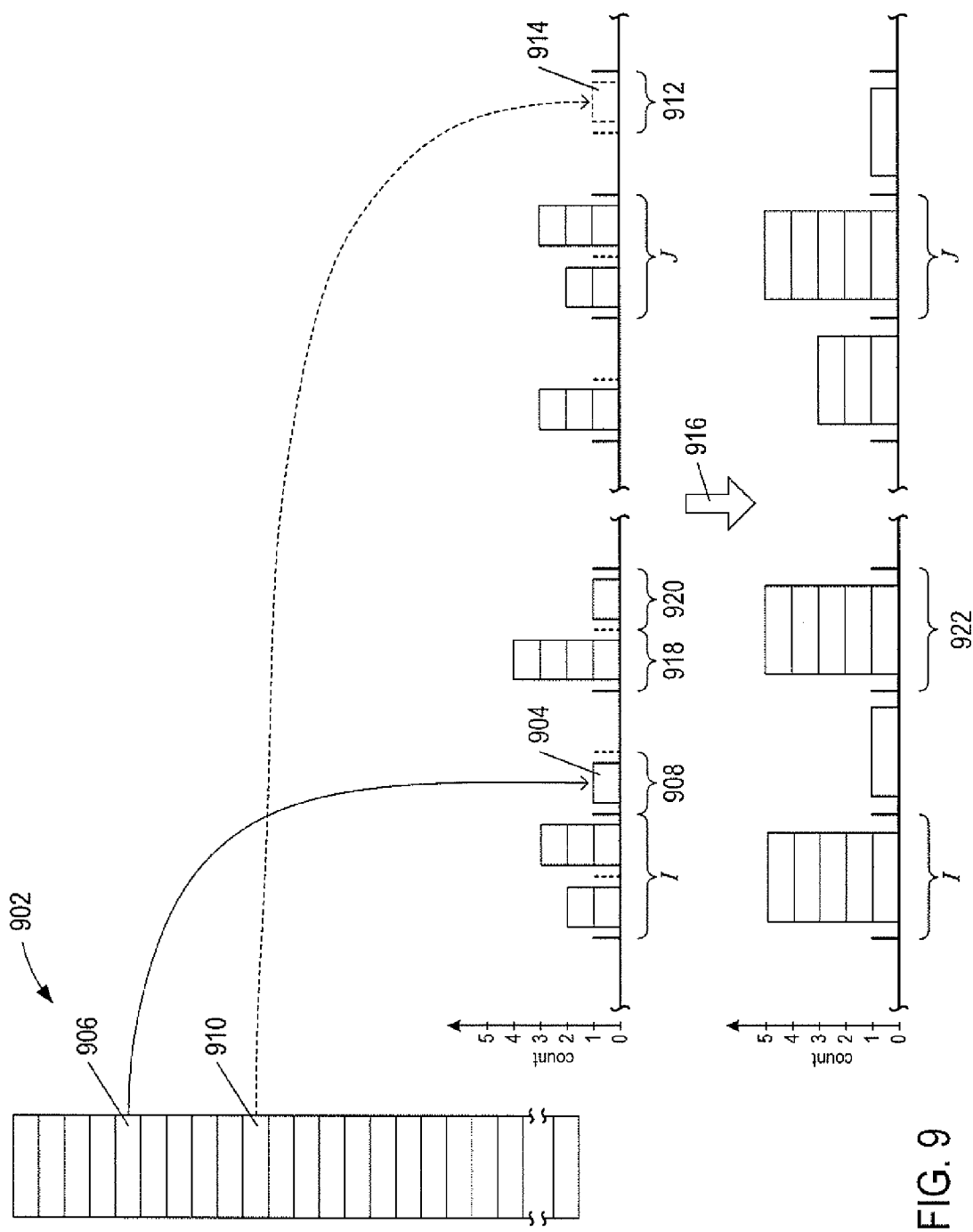
FIG. 9 shows an example array of metric data sent to a worker node and associated data-structure subintervals.

FIG. 9 shows an example array 902 of metric data sent to a worker node and data-structure subintervals surrounding Ith and Jth data-structure intervals. Blocks each represent a count of 1 added to a count associated with each data-structure subinterval when a metric value of the array 902 lies within a data-structure subinterval. For example, block 904 represents a count of 1 for a metric value stored in array element 906 that lies within the data-structure subinterval 908. The array 902 also includes an array element 910 with a metric value that lies in a data-structure subinterval 912 outside the Ith to Jth data-structure intervals. Dashed line block 914 represents a count of 1 for the metric value stored in array element 910 that lies in the data-structure subinterval 912. As a result, the worker node downgrades the subintervals to the data-structure intervals as indicated by directional arrow 916. In downgrading the data-structure subintervals to the data-structure intervals, the counts associated with each data-structure subinterval are summed to give the count of each data-structure interval. For example, count 4 of subinterval 918 and count 1 of subinterval 920 are summed to give count 5 for interval 922.

As explained above with reference to FIG. 1B, each worker node sends worker-node data to the master node 102. The worker-node data may be a subset of metric data a worker node received from the data sources 106 or a data structure of the subset of metric data. The master node 102 combines worker-node data to generate the master-data structure 108 of the full set of metric data output from the data sources 106, as described in detail below with reference to FIGS. 17-19. The master node 102 converts arrays of metric data to data structures and aggregates intermediate pairs of data structures. When two structures have the same interval degree, the counts of overlapping intervals or subintervals are summed to obtain counts for intervals or subintervals in an aggregated data structure. On the other hand, when the two data structures have different interval degrees, the data structure with the larger interval degree is first downgraded to match the interval degree of the data structure with the smaller interval degree followed by summing the counts of overlapping intervals or subintervals to obtain counts for intervals or subintervals in an aggregated data structure. Two data structures that are to be combined to form an aggregated data structure belong to one of three categories: 1) the two data structures completely overlap, 2) the two data structures partially overlap, and 3) the two data structures do not overlap. Examples of combining data structures that belong to the three categories are described with reference to FIGS. 10-12. When an aggregated data structure obtained from combining partially overlapping or non-overlapping data structures exceeds the memory bound of the master node, the aggregated data structure is downgraded to a smaller interval degree.

Figure 10:
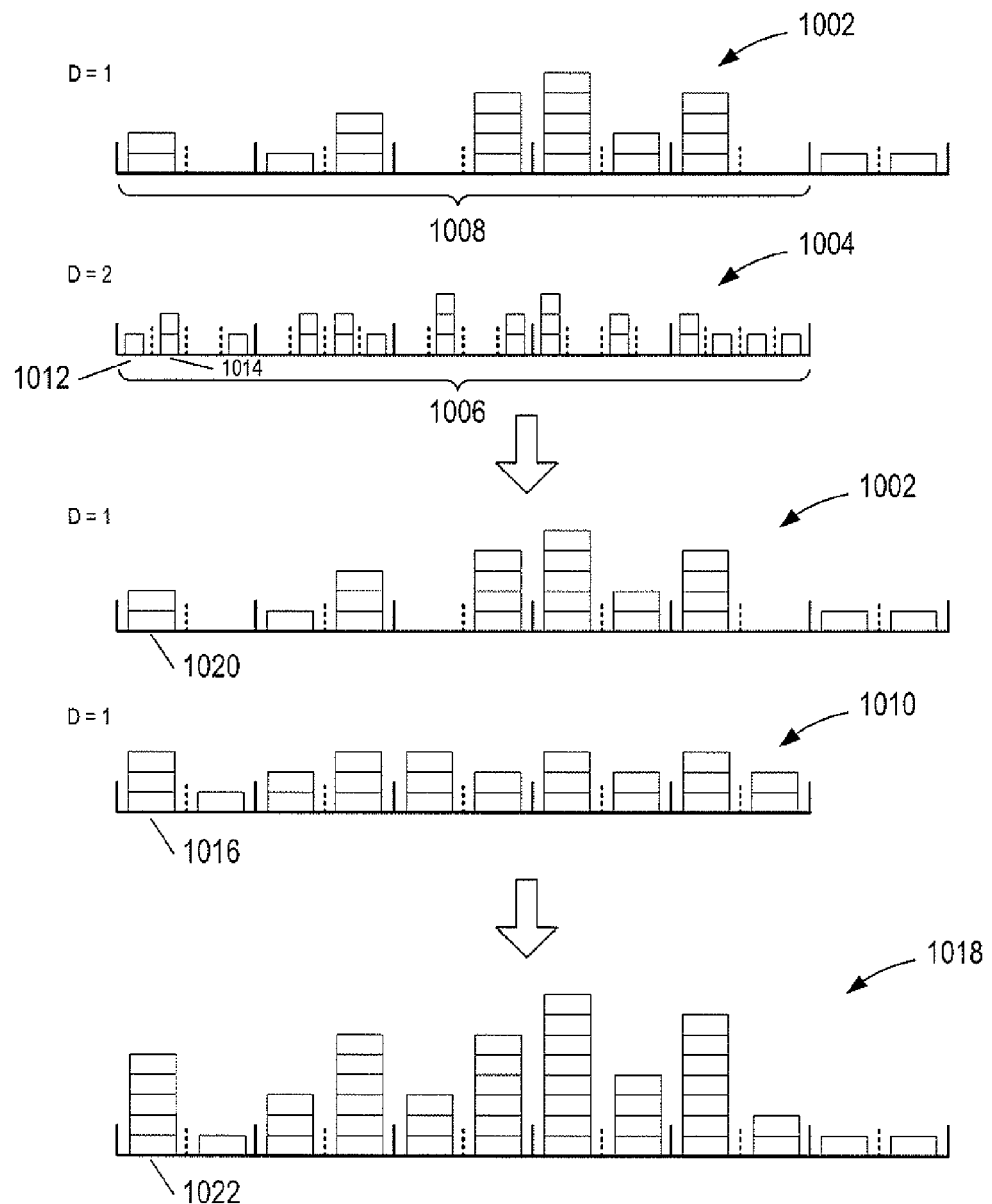
FIG. 10 shows an example of combining two completely overlapping data structures.

FIG. 10 shows an example of combining two completely overlapping data structures. A first data structure 1002 has an interval degree D=1 which corresponds to the each interval divided into two half-length subintervals. A second data structure 1004 has an interval degree D=2, which corresponds to each interval divided into four equally spaced quarter-length subintervals. All five intervals 1006 of the data structure 1004 overlap with five intervals 1008 of the data structure 1002. Because the interval degrees of the data structures 1002 and 1004 are different, the data structure 1004 is downgraded from interval degree D=2 to a data structure 1010 with integral degree D=1 by reducing quarter-length subintervals to half-length subintervals. The counts of the quarter-length subintervals of the data structure 1004 are combined to give counts for each of the half-length subintervals in the data structure 1010. For example, count 1 of quarter-length subinterval 1012 and count 2 of quarter-length subinterval 1014 of the data structure 1004 are summed to give count 3 of half-length subinterval 1016. The counts in overlapping subintervals of the data structures 1002 and 1010 are summed to give an aggregated data structure 1018. For example, subinterval 1016 of data structure 1010 overlaps subinterval 1020 of data structure 1002. Count 2 of subinterval 1020 and count 3 of subinterval 1016 are summed to give count 5 for subinterval 1022 of the aggregated data structure 1018.

Figure 11:
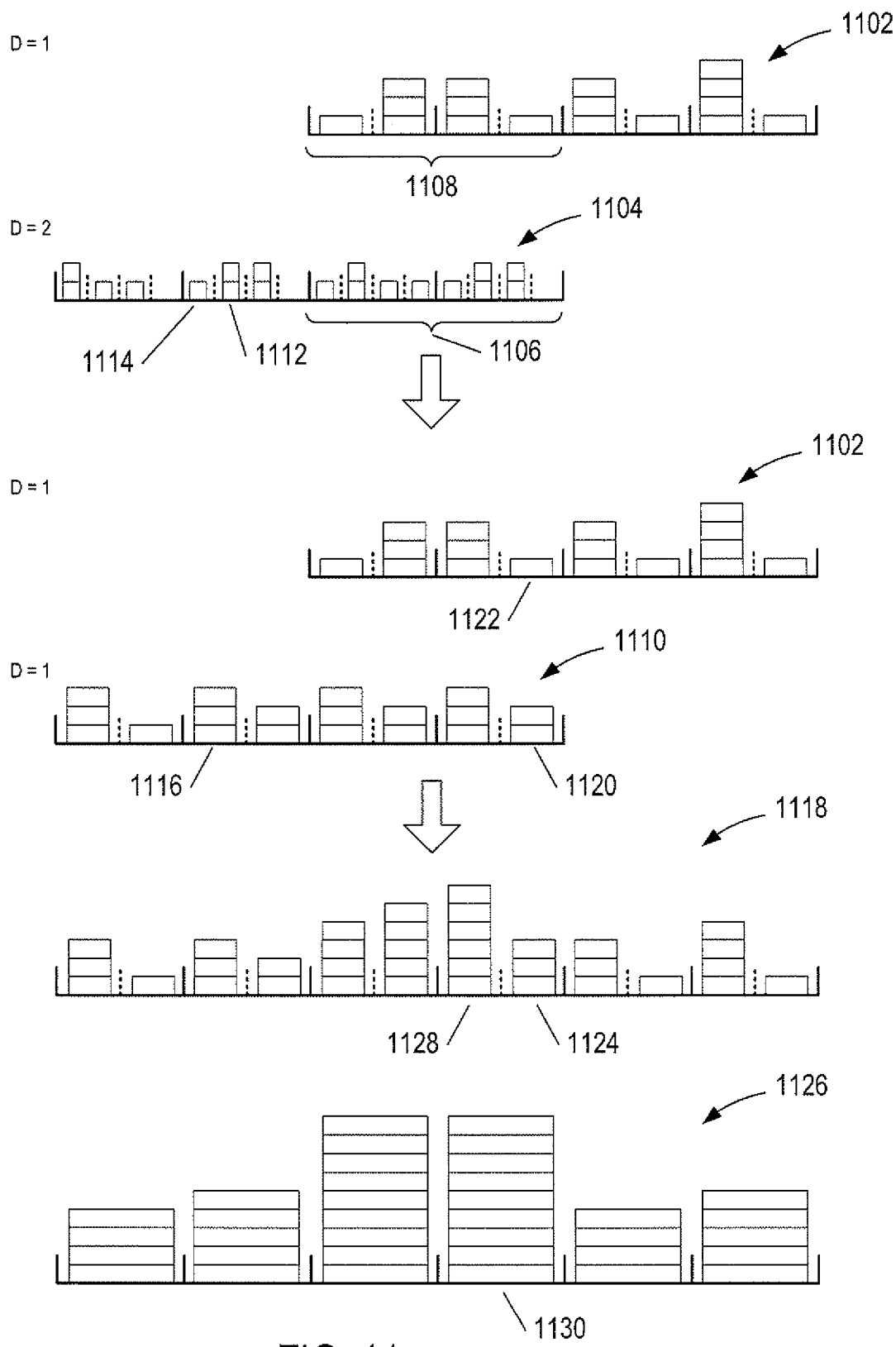
FIG. 11 shows an example of combining two partially overlapping data structures.

FIG. 11 shows an example of combining two partially overlapping data structures. A first data structure 1102 has an interval degree D=1, and a second data 1104 has an interval degree D=2. As shown in FIG. 11, two intervals 1106 of the data structure 1104 partially overlap with two intervals 1108 of the data structure 1102. Because the interval degrees of the data structures 1102 and 1104 are different, the data structure 1104 is downgraded from interval degree D=2 to a data structure 1110 of integral degree D=1 by reducing quarter-length subintervals to half-length subintervals. In other words, the counts of the quarter-length subintervals of the data structure 1104 are combined to give counts for each of the half-length subintervals in the data structure 1110. For example, count 2 of quarter-length subinterval 1112 and count 1 of quarter-length subinterval 1114 are summed to give count 3 of half-length subinterval 1116. The counts in overlapping subintervals of the data structures 1102 and 1110 are summed to give an aggregated data structure 1118. For example, subinterval 1120 of data structure 1110 overlaps subinterval 1122 of data structure 1102. Count 2 of subinterval 1120 and count 1 of subinterval 1122 are summed to give count 3 for subinterval 1124 of the aggregated data structure 1118.

If the aggregated data structure 1118 is greater than the memory bound of the master node, the aggregated data structure 1118 is downgraded to an aggregated data structure with a smaller integral degree. For example, FIG. 11 includes an aggregated data structure 1126 obtained from downgrading the data structure 1118. Downgraded data structure 1126 is obtained by combining half-length subintervals into intervals and summing counts of the half-length subintervals to give counts for the intervals. For example, half-length subintervals 1124 and 1128 are combined to give interval 1130 and count 3 of half-length subinterval 1124 is added to count 6 of half-length subinterval 1128 to give count 9 of the interval 1130.

Figure 12:
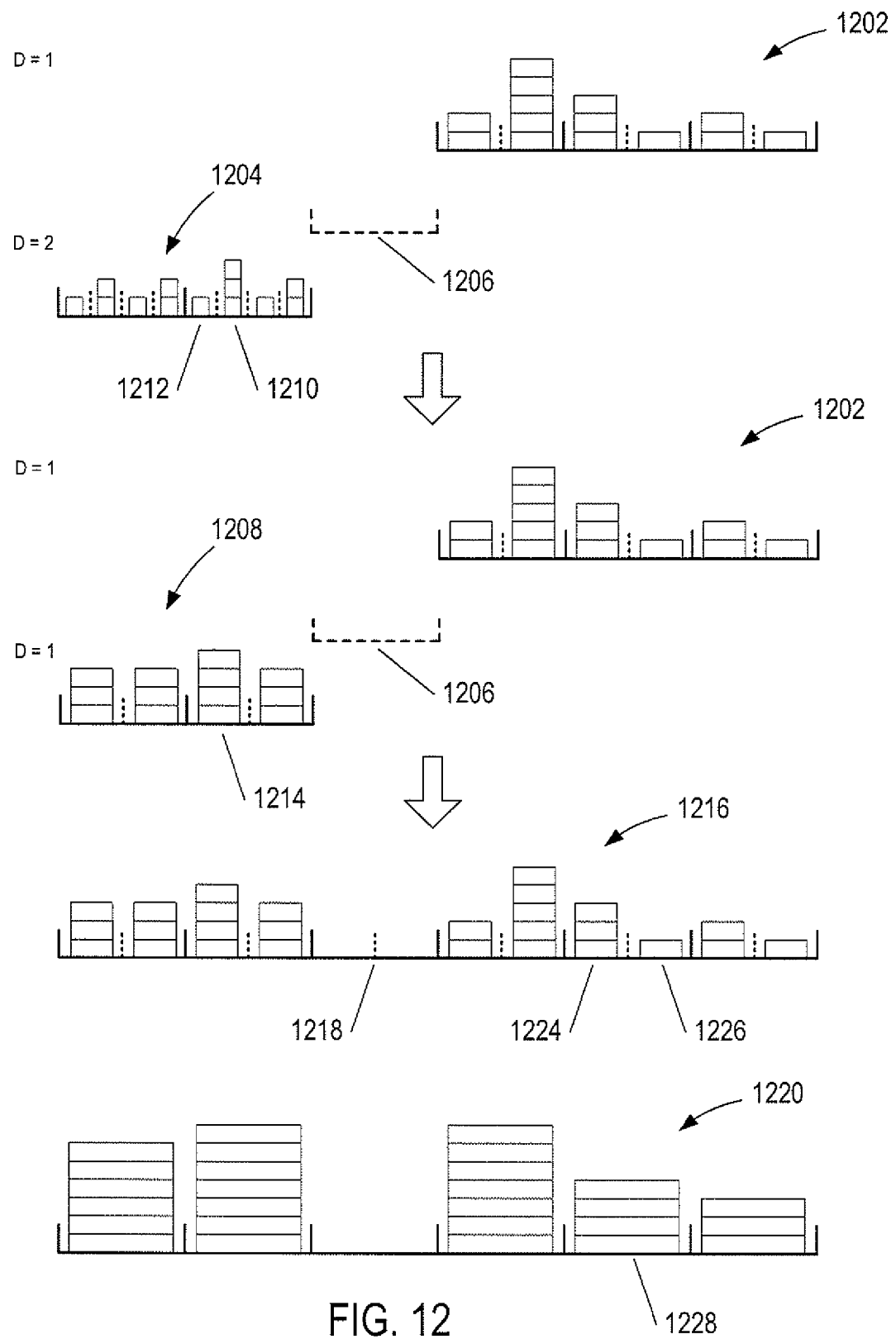
FIG. 12 shows an example of combining two non-overlapping data structures.

FIG. 12 shows an example of combining two non-overlapping data structures. A first data structure 1202 has an interval degree D=1, and a second data 1204 has an interval degree D=2. In this example, the non-overlapping data structures 1202 and 1204 are separated one interval 1206. Because the interval degrees of the data structures 1202 and 1204 are different, the data structure 1204 is downgraded from interval degree D=2 to a data structure 1208 of integral degree D=1 by reducing quarter-length subintervals to half-length subintervals. The counts of the quarter-length subintervals of the data structure 1204 are summed to give counts for each of the half-length subintervals in the data structure 1208. For example, count 3 of quarter-length subinterval 1210 and count 1 of quarter-length subinterval 1212 are summed to give count 4 of half-length subinterval 1214. An aggregate data structure 1216 of the two non-overlapping data structures 1202 and 1208 is obtained by introducing an interval 1218 with half-length subintervals that accounts for the interval 206 separation between the two data structures 1202 and 1208. The counts of the introduced subintervals are set to zero.

If the aggregated data structure 1216 is greater than the memory bound of the master node, the aggregated data structure 1216 is downgraded to an aggregated data structure with a smaller integral degree. For example, FIG. 12 includes an aggregated data structure 1220 obtained from downgrading the data structure 1216. Downgraded data structure 1220 is obtained by combining half-length subintervals into intervals and summing counts of the half-length subintervals to give counts for the intervals. For example, half-length subintervals 1224 and 1226 are combined to give interval 1228 and count 3 of half-length subinterval 1224 is added to count 1 of half-length subinterval 1226 to give count 4 of the interval 1228.

Once worker-node data has been received by the master node 102, the master node 102 calculates a pth percentile value in response to the query. If the master-data structure stored in the master node is an array of M metric values, the M array values are rank ordered. The rank r of the pth percentile of M ordered array values is calculated according to:

$$r = \frac{p}{100} \times M + \frac{1}{2} \quad (10)$$

The pth percentile is the array value with rank r rounded to the nearest integer. On the other hand, when the master-data structure stored in the master node are data-structure intervals and the total number of counts over the intervals is Q, the rank R of the pth percentile is calculated according to:

$$R = \frac{p}{100} \times Q + \frac{1}{2} \quad (11)$$

The pth percentile is the count of the data-structure interval with rank R rounded to the nearest integer. When the Rth interval is a regular interval, the maximum possible relative error rate is e. On the other hand, when the Rth interval is a special interval, the absolute error is less than the absolute value of the difference INTERVAL_MAX−INTERVAL_MIN.

Figure 13:
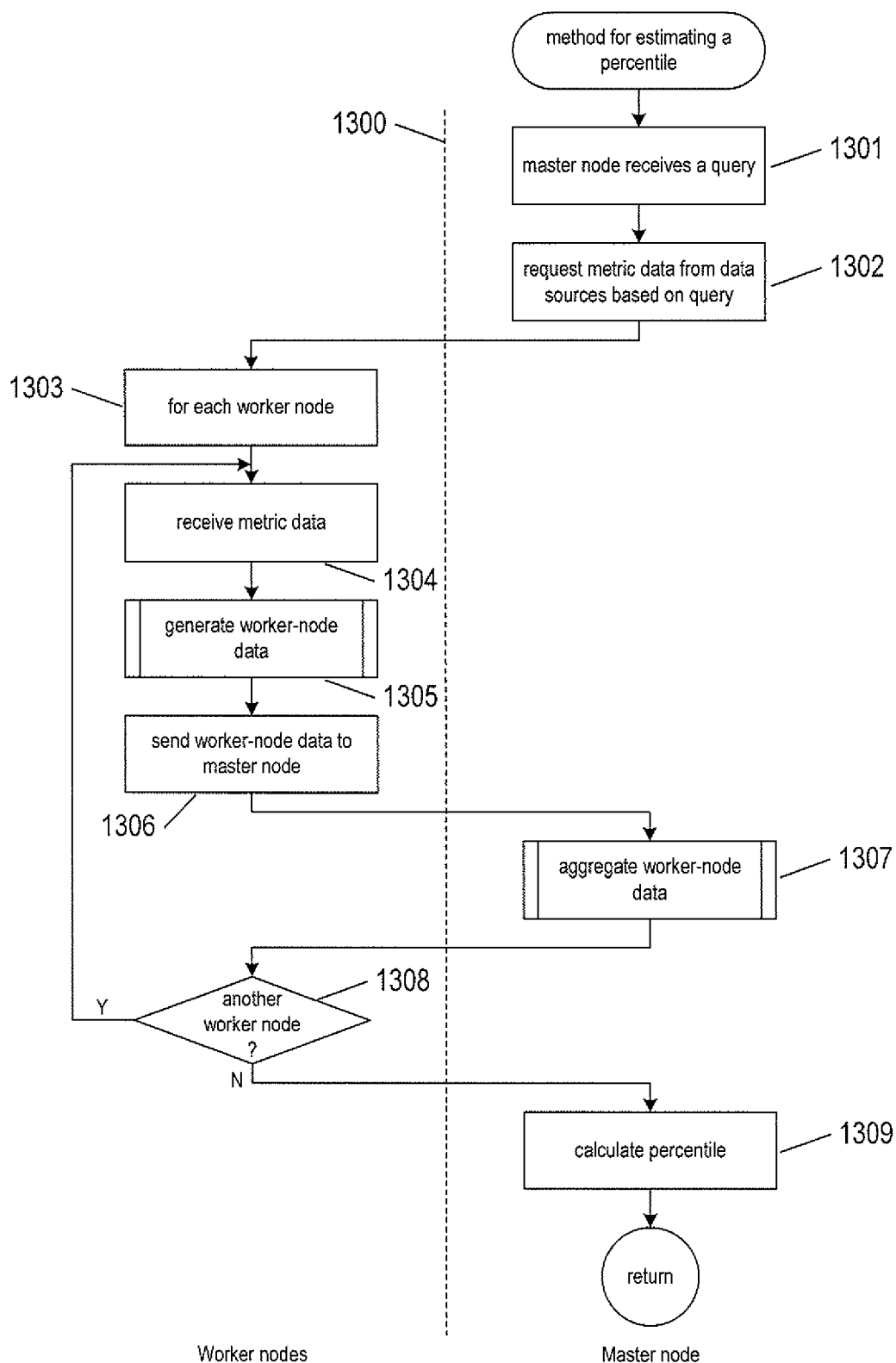
FIG. 13 shows a flow-control diagram of a method for estimating a percentile of metric data output from data sources in a computing environment.
Figure 14:
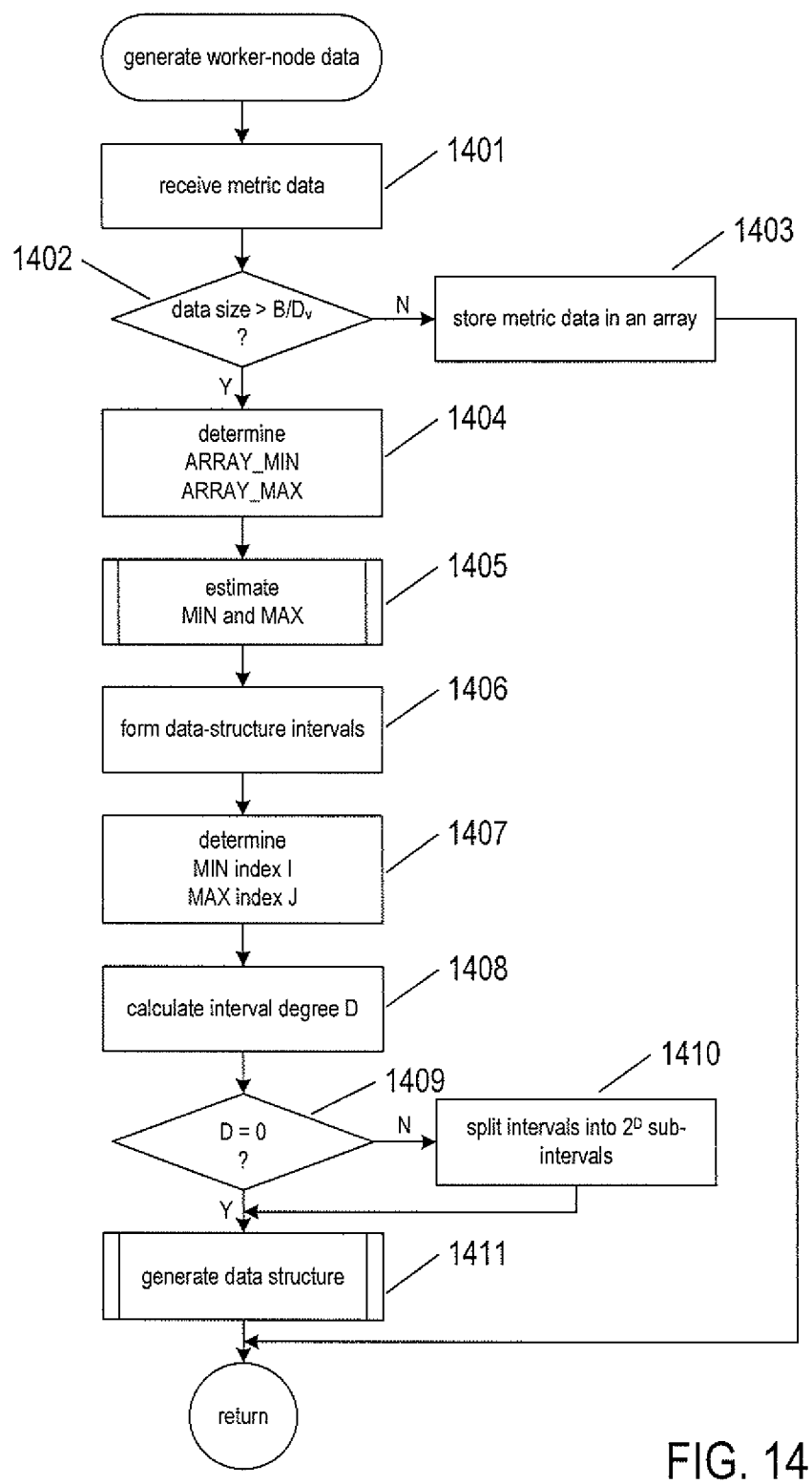
FIG. 14 shows a flow-control diagram for the routine "generate worker-node data" called in block 1305 of FIG. 13.
Figure 17:
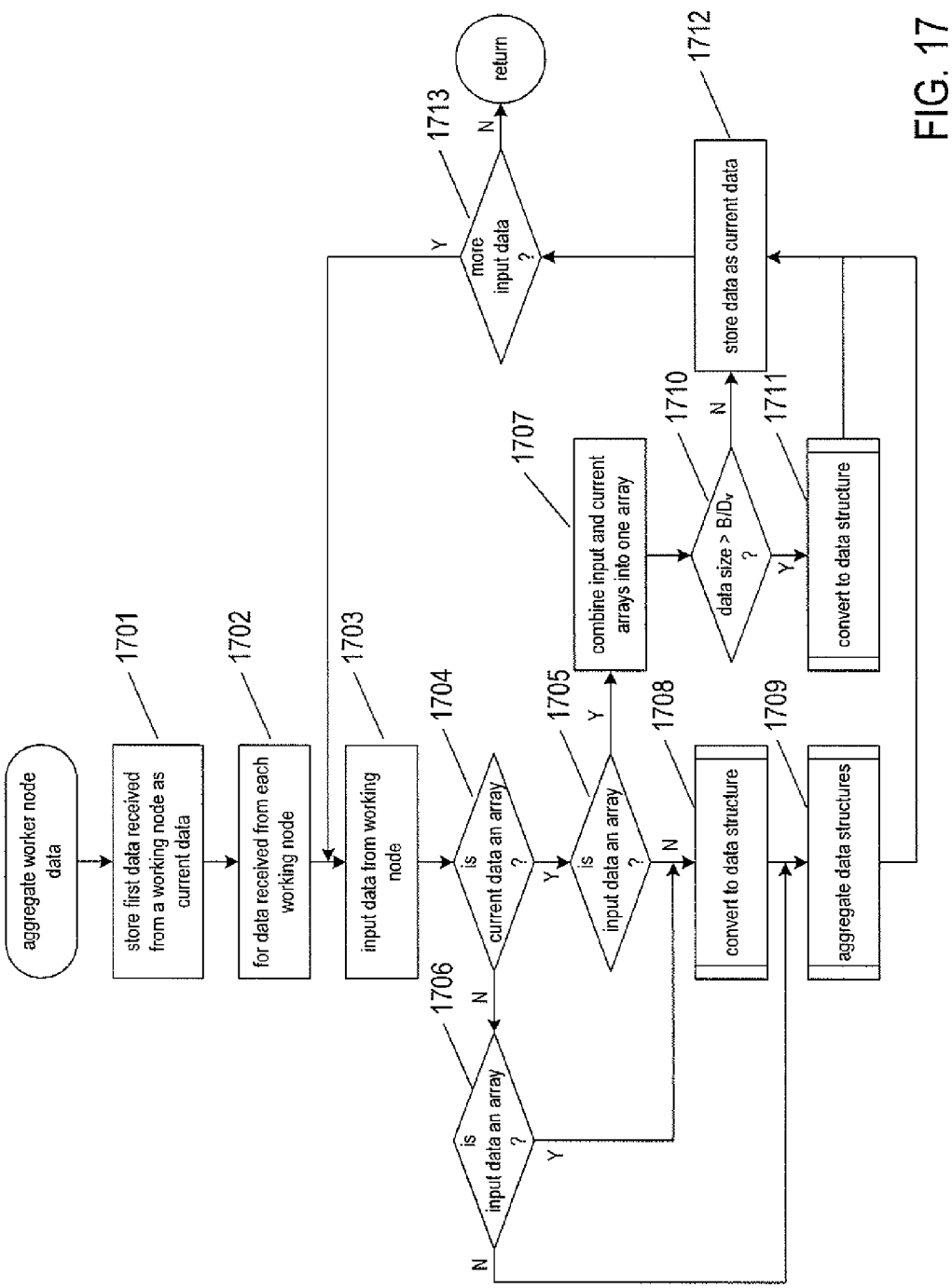
FIG. 17 shows a flow-control diagram of the routine "aggregate worker-node data" called in block 1307 of FIG. 13.

FIG. 13 shows a flow-control diagram of a method for estimating a percentile of metric data output from data sources in a computing environment. Dashed line 1300 separates blocks 1303-1306 and 1308 that represent operations performed by worker nodes from blocks 1301, 1302, 1307, and 1309 that represent operations performed by a master node. In block 1301, a master node receives a query regarding a set of virtual or physical computational resources, as described above with reference to FIG. 1A. In block 1302, the query is sent from the master node to the data sources and the data sources respond by generating metric data, as described above with reference to FIG. 1A. A for-loop beginning with block 1303 repeats the operations represented by blocks 1304-1306 and 1308 for each worker node. In block 1304, a worker node receives a unique subset of metric data generated by the data sources. The subset of metric data may be determined from manual partitioning or use of a load balancer as described above with reference to FIG. 1B. In block 1305, a routine "generate worker-node data" described below with reference to FIG. 14 is called to generate worker-node data from the metric data. The worker-node data may be either the metric data sent to the worker node or a data structure of the metric data. In block 1306, the worker-node data generated by the routine "generate worker-node data" is sent to the master node. In block 1307, the master node receives the worker-node data from the worker node and a routine "aggregate worker-node data" described below with reference to FIG. 17 is called to aggregate the worker-node data received from each of the worker nodes into a master-data structure. In decision block 1308, when the full set of worker nodes have sent worker-node data to the master node, control flows back to the master node in block 1309. Otherwise, the operations in blocks 1304-1307 are repeated for another worker node. The master-data structure is the final data structure formed as a result of repeated execution of block 1307 to aggregate the separate worker-node data supplied by each of the worker nodes. In block 1309, estimated percentiles are calculated using the master-data structure generated in block 1307 as described above with reference to Equations (10) and (11).

FIG. 14 shows a flow-control diagram for the routine "generate worker-node data" called in block 1305 of FIG. 13. In block 1401, metric data is received. In decision block 1402, when size of the metric data is less than or equal to the data size of the worker-node memory, control flows to block 1403. Otherwise, control flows to block 1404. In block 1403, because the size of the metric data is less than or equal to the data size of the worker-node memory, the metric data is stored in an array, as described above with reference to FIG. 3. In block 1404, because the amount of metric data received by the worker node is to exceed the memory capacity of the worker node, the worker node determines an ARRAY_MIN and an ARRAY_MAX of an array of metric data currently stored by the worker node, as described above with reference to FIG. 3. In block 1405, the worker node calls a routine "estimate MIN and MAX" described below with reference to FIG. 15 in order to estimate minimum and maximum metric values for the full set of metric data to be received by the worker node. In block 1406, data-structure intervals are formed for a fraction f, percentage e, and index n as described above with reference to FIG. 4. In block 1407, interval indices I and J of the data-structure intervals the values MIN and MAX belong to are identified as described above with reference to FIG. 5. In block 1408, an interval degree D is calculated for the data structure intervals according to Equation (8). In decision block 1409, when the interval degree is zero, control flows block 1411. Otherwise, when the interval degree is greater than zero, control flows to block 1410. In block 1410, each of the intervals of the data structure is divided into equally space subintervals according to Equation (9) as described above with reference to FIG. 7. In block 1411, a routine "generate data structure" described below with reference FIG. 16 is called to generate a data structure for the data-structure intervals.

Figure 15:
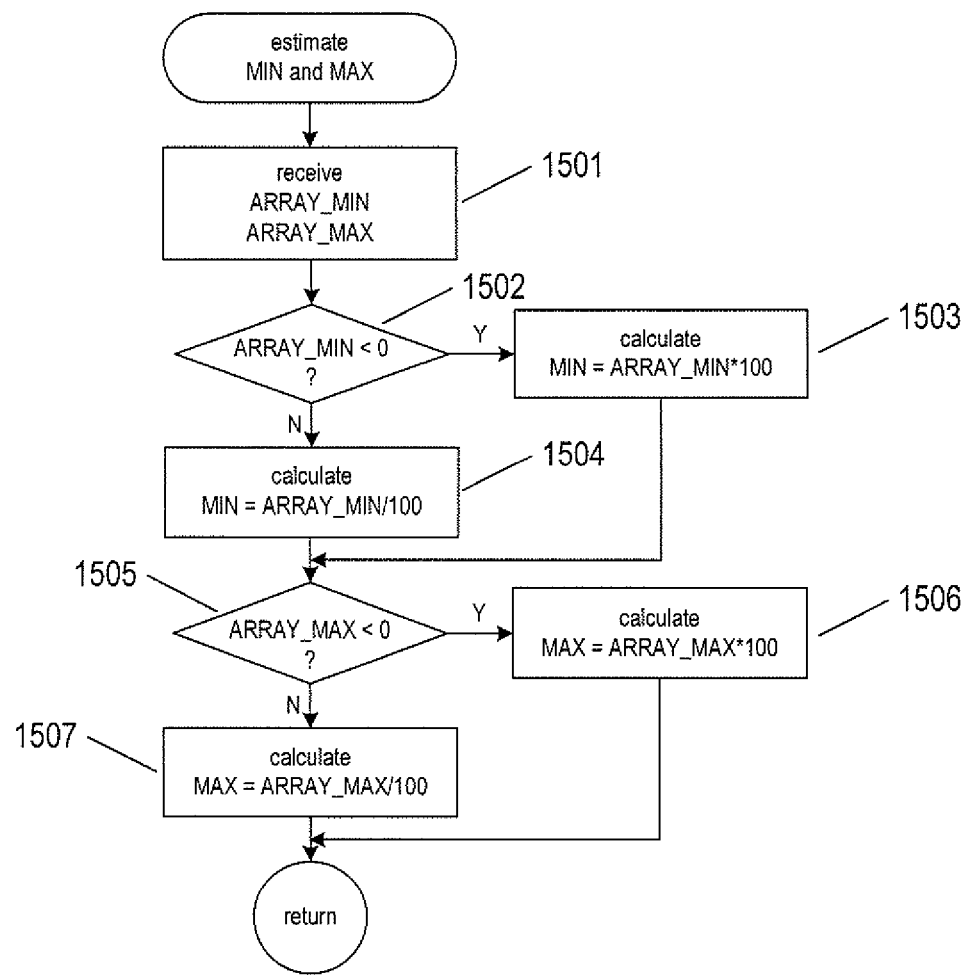
FIG. 15 shows a flow-control diagram for the routine "estimate MIN and MAX" called in block 1405 of FIG. 14.

FIG. 15 shows a flow-control diagram for the routine "estimate MIN and MAX" called in block 1405 of FIG. 14. In block 1501, ARRAY_MIN and ARRAY_MAX determined in block 1404 of FIG. 14 are received. In decision block 1502, when ARRAY_MIN is less than zero, control flows block 1503. Otherwise, control flows to block 1504. In blocks 1503 and 1504, an estimated minimum metric value, MIN, for the full set of metric data to be received by the worker node is calculated according to Equation (6). In decision block 1505, when ARRAY_MAX is less than zero, control flows block 1506. Otherwise, control flows to block 1507. In blocks 1506 and 1507, an estimated maximum metric value, MAX, for the full set of metric data to be received by the worker node is calculated according to Equation (7).

Figure 16:
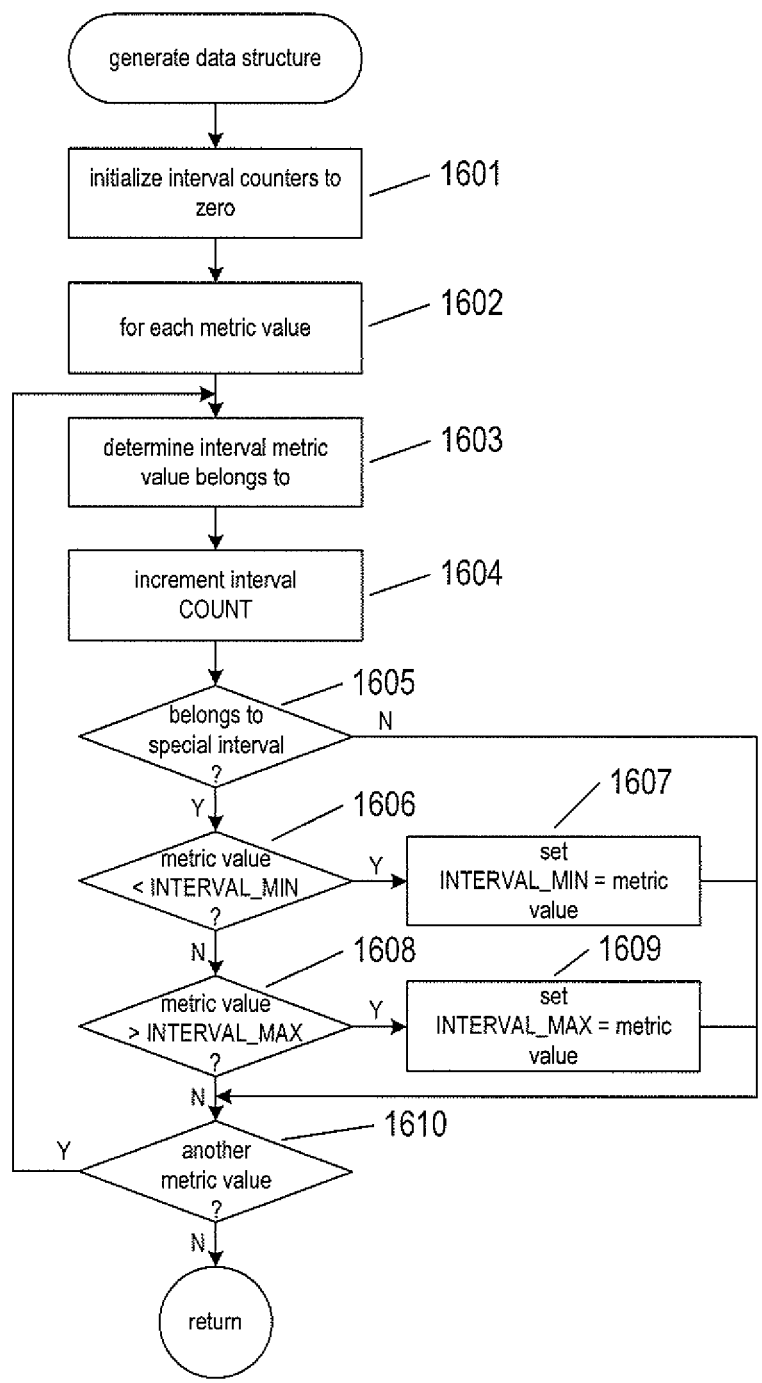
FIG. 16 shows of a flow-control diagram for the routine "generate data structures" called in block 1410 of FIG. 14.

FIG. 16 shows of a flow-control diagram for the routine "generate data structures" called in block 1410 of FIG. 14. In block 1601, data-structure interval counters are initialized to zero. A for-loop beginning with block 1602 repeats the operations in blocks 1603-1610 for each metric value of the metric data received by the worker node. In block 1603, a data-structure interval or subinterval that contains a metric value is identified. In block 1604, the counter, COUNT, associated with the data-structure interval or subinterval is incremented as described above with reference to FIGS. 8 and 9. In decision block 1605, when the data-structure interval or subinterval is a positive-end or negative-end special interval, control flows to decision block 1606. Otherwise, control flows to decision block 1616. In decision block 1606, when the metric value is less than INTERVAL_MIN, INTERVAL_MIN is reset to the metric value in block 1607. Otherwise, control flows to decision block 1608. In decision block 1608, when the metric value is greater than INTERVAL_MAX, INTERVAL_MAX is reset to the metric value in block 1609. In decision block 1610, the operations represented in blocks 1603-1609 are repeated for another metric value. Otherwise, the data structure is returned.

Figure 18:
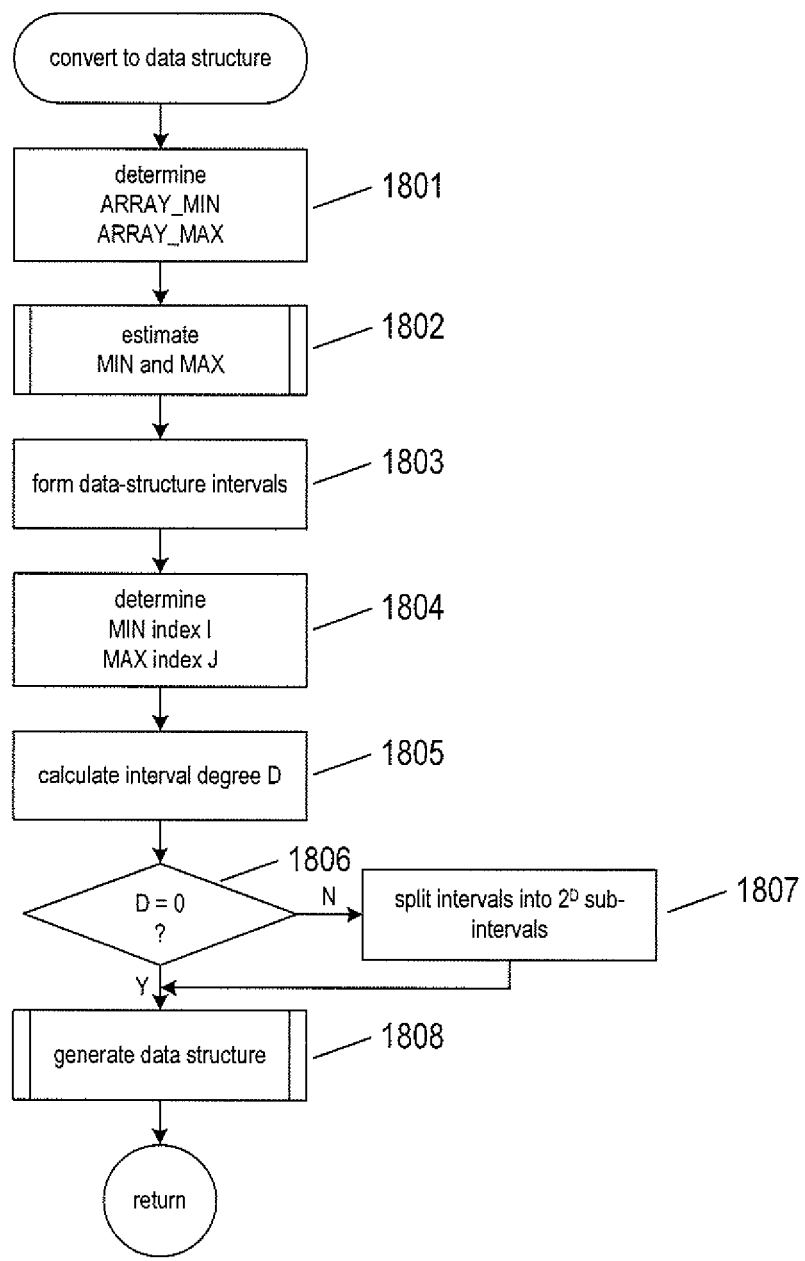
FIG. 18 shows a flow-control diagram for the routine "convert to data structure" called in block 1708 and 1711 of FIG. 17.

FIG. 17 shows a flow-control diagram of the routine "aggregate worker-node data" called in block 1307 of FIG. 13. In block 1701, current data is initialized as the first worker-node data received by the master node. The current data can be an array of metric data or a data structure of the metric data. A for-loop beginning with block 1702 repeats the operations in blocks 1703-1713 for each set of worker-node data received from the worker nodes after receipt of the first worker-node data. In block 1703, worker-node data is received from a worker node other than the first worker node to send worker-node data. The worker-node data received after the first worker-node data is called "input data." In decision block 1704, when the current data is an array, control flows to decision block 1705. Otherwise, when the current data is not an array, the current data is a data structure and control flows to decision block 1706. In decision block 1705, when the input data is also an array, control flows to block 1707 in which the current and input data arrays are combined to form a signal array. Otherwise, control flows to block 1708 in which a routine "convert to data structure" described below with reference to FIG. 18 is called to convert the current data into a data structure. In decision block 1706, if the input data is an array of metric data, control flows to block 1708 in which the routine "convert to data structure" is called to convert the input data into a data structure. Otherwise, both the current data and the input data are both data structures and control flows to block 1709. In block 1709, a routine "aggregate data structures" described below with reference to 19 is called to combine two data structures. Decision block 1710 checks the size of the combined array of metric data generated in block 1707. When the size of the combined array is larger than the memory bound of the master node, control flows to block 1711 in which the routine "convert to data structures" is called to convert the combined array of metric data to a data structure. When the size of the combined array is smaller than the memory bound of the master node, control flows to block 1712. In block 1712, the current data is updated by storing the combined array output from the decision block 1710 or the data structure output from decision block 1711 as the current data. In decision block 1713, when additional input data is received, the operations in blocks 1703-1712 are repeated. After receiving input data from each of the worker nodes and repeatedly applying the operations represented by blocks 1703-1713 to update the current data with the input data, the current data that is finally obtained after the worker nodes sent their worker-node data and stored in block 1712 is the master-data structure described above with reference to block 1307 of FIG. 13.

FIG. 18 shows a flow-control diagram for the routine "convert to data structure" called in block 1708 and 1711 of FIG. 17. Blocks 1801-1807 represent the same operations as corresponding operations represented by blocks 1404-1411 in the flow-control diagram for the routine "generate worker-node data" in FIG. 14.

Figure 19:
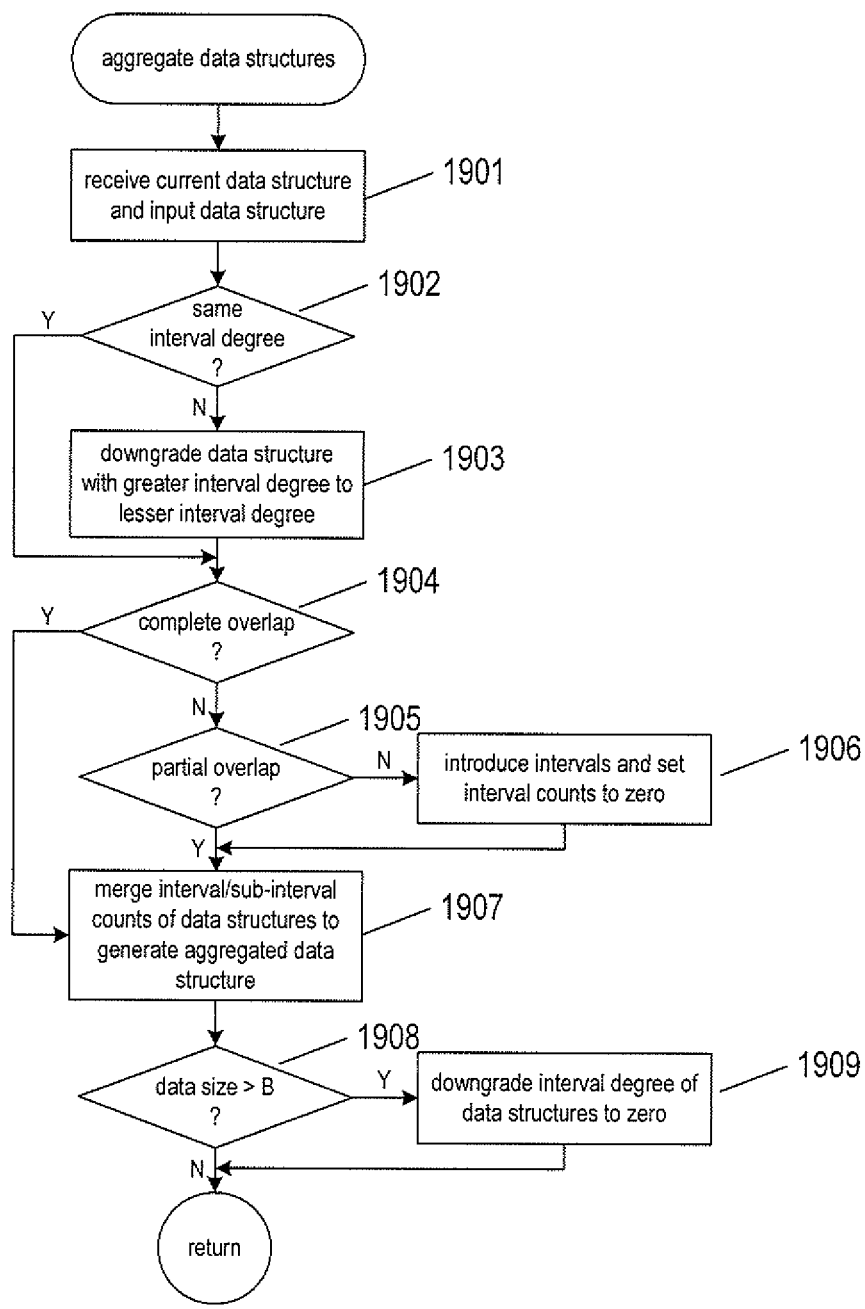
FIG. 19 shows a flow-control diagram for the routine "aggregate data structures" called in block 1709 of FIG. 17.

FIG. 19 shows a flow-control diagram for the routine "aggregate data structures" called in block 1709 of FIG. 17. In block 1901, the current data structure and input data structure are received. In decision block 1902, when the interval degree for the current data structure is different from the interval degree for the input data structure, control flows to block 1903. Otherwise, control flows to decision block 1904. In block 1903, the data structure with the greater interval degree is downgraded to the same interval degree of the data structure with the smaller interval degree. In decision block 1904, when the current and input data structures completely overlap as described above with reference to FIG. 10, control flows to block 1907. Otherwise, control flows to decision block 1905. In decision block 1905, when the current and input data structures do not partially overlap, control flows to block 1906. Otherwise, control flows to block 1907. In block 1906, intervals are introduced to fill the separation between non-overlapping current and input data structures and the counts for the introduced intervals are set to zero, as described above with reference to FIG. 12. In block 1907, the current and input data structures are combined to generate an aggregate data structure as described above with reference to FIGS. 10-12. In decision block 1908, when the data size of the aggregate data structure is larger than the memory bound for the master node, control flows to block 1909 in which the interval degree of the aggregate data structure is downgraded to zero. The aggregate data structure returned to the method in FIG. 17 at block 1709 replaces the current data in block 1712 of FIG. 17.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method stored in one or more data-storage devices and executed using one or more processors of a computing environment, the method comprising:
    receiving a query at a master node about use of computational resources of the computing environment;
    distributing metric data generated by data sources in the computing environment to one or more worker nodes, the metric data represents use of the computational resources;
    each worker node performs the following:
        receiving the query from the master node,
        generating worker-node data that represents the metric data received by the worker node in response to the query, and
        sending the worker-node data to the master node; and calculating at the master node a master-data structure that represents a distribution of the metric data over data-structure intervals based on the worker-node data sent from the worker nodes.

2. The method of claim 1 further comprises calculating estimated percentiles from the master-data structure based on the query.

3. The method of claim 1, wherein distributing the metric data further comprises:
  generating the metric data at the data sources of the computing environment that use the computational resources;
  partitioning the metric data into two or more unique subsets of the metric data; and
  sending a unique subset of the metric data to each of the two or more worker nodes.

4. The method of claim 1, wherein generating the worker-node data that represents the metric data received by the worker node further comprises when data size of the metric data received by the worker node is less than or equal to a memory bound of the worker node, the worker-node data is an array of the metric data.

5. The method of claim 1, wherein generating the worker-node data that represents the metric data received by the worker node further comprises when the data size of the metric data is greater than the memory bound of the worker node, generating a data structure that represents a distribution of the metric data received by the worker, the worker-node data is the data structure.

6. The method of claim 5, wherein generating the data structure that represents the distribution of the metric data further comprises:
  estimating a minimum-metric value and a maximum-metric value for the subset of metric data received by the worker node;
  forming data-structure intervals that combined cover values of the metric data;
  identifying data-structure intervals the estimated minimum-metric value and the estimated maximum-metric value are in;
  calculating an interval degree D based on the number of data-structure intervals and a number of intervals between and including the data-structure intervals that contain the estimated minimum-metric value and the estimated maximum-metric value; and
  counting each metric value of the metric data that lies in the data-structure intervals to form a frequency distribution the metric data over the data-structure intervals.

7. The method of claim 6, further comprises:
  when the interval degree D is greater than or equal to one, splitting each of the data-structure intervals into $2^D$ data-structure subintervals; and
  counting each metric value of the metric data that lies in the data-structure subintervals to form a frequency distribution the metric data over the data-structure subintervals.

8. The method of claim 1, wherein calculating the master-data structure further comprises:
  initializing current data as first worker-node data received; and
  for each worker-node data received after the first worker-node data,
    combining the worker-node data with the current data to update current data, the current data being the master-data structure when worker nodes have finished.

9. The method of claim 1, wherein combining the worker-node data with the current data to update the current data further comprises:
  when current data and the worker-node data are metric data, combining current data and worker-node data to update current data;
  when current data is metric data and the worker-node data is a data structure, converting the current data to a data structure and aggregating the current data with the worker-node data;
  when current data is a data structure and the worker-node data is metric data, converting the worker-node data to a data structure and aggregating the current data with the worker-node data; and
  when current data and the worker-node data are data structures, aggregating the current data with the worker-node data.

10. The method of claim 1, wherein a single worker node operates at the master node when a volume of the metric data output from the data sources is below a threshold.

11. A system for generating a data structure of metric data generated in a computing environment comprising:
  one or more processors;
  one or more data-storage devices; and
  a routine stored in the data-storage devices and executed using the one or more processors, the routine
    receiving a query at a master node about use of computational resources of the computing environment;
    distributing metric data generated by data sources in the computing environment to one or more worker nodes, the metric data represents use of the computational resources;
    each worker node performs the following:
      receiving the query from the master node,
      generating worker-node data that represents the metric data received by the worker node in response to the query, and
      sending the worker-node data to the master node; and
    calculating at the master node a master-data structure that represents a distribution of the metric data over data-structure intervals based on the worker-node data sent from the worker nodes.

12. The system of claim 11 further comprises calculating estimated percentiles from the master-data structure based on the query.

13. The system of claim 11, wherein distributing the metric data further comprises:
  generating the metric data at data sources of the computing environment that use the computational resources;
  partitioning the metric data into two or more unique subsets of the metric data; and
  sending a unique subset of the metric data to each of the two or more worker nodes.

14. The system of claim 11, wherein generating the worker-node data that represents the metric data received by the worker node further comprises when data size of the metric data received by the worker node is less than or equal to a memory bound of the worker node, the worker-node data is an array of the metric data.

15. The system of claim 11, wherein generating the worker-node data that represents the metric data received by the worker node further comprises when the data size of the metric data is greater than the memory bound of the worker node, generating a data structure that represents a distribution of the metric data received by the worker, the worker-node data is the data structure.

16. The system of claim 15, wherein generating the data structure that represents the distribution of the metric data further comprises:
   estimating a minimum-metric value and a maximum-metric value for the subset of metric data received by the worker node;
   forming data-structure intervals that combined cover values of the metric data;
   identifying data-structure intervals the estimated minimum-metric value and the estimated maximum-metric value are in;
   calculating an interval degree D based on the number of data-structure intervals and a number of intervals between and including the data-structure intervals that contain the estimated minimum-metric value and the estimated maximum-metric value; and
   counting each metric value of the metric data that lies in the data-structure intervals to form a frequency distribution the metric data over the data-structure intervals.

17. The system of claim 16, further comprises:
   when the interval degree D is greater than or equal to one, splitting each of the data-structure intervals into $2^D$ data-structure subintervals; and
   counting each metric value of the metric data that lies in the data-structure subintervals to form a frequency distribution the metric data over the data-structure subintervals.

18. The system of claim 11, wherein calculating the master-data structure further comprises:
   initializing current data as first worker-node data received; and
   for each worker-node data received after the first worker-node data,
      combining the worker-node data with the current data to update current data, the current data being the master-data structure when worker nodes have finished.

19. The system of claim 18, wherein combining the worker-node data with the current data to update the current data further comprises:
   when current data and the worker-node data are metric data, combining current data and worker-node data to update current data;
   when current data is metric data and the worker-node data is a data structure, converting the current data to a data structure and aggregating the current data with the worker-node data;
   when current data is a data structure and the worker-node data is metric data, converting the worker-node data to a data structure and aggregating the current data with the worker-node data; and
   when current data and the worker-node data are data structures, aggregating the current data with the worker-node data.

20. The system of claim 11, wherein a single worker node operates at the master node when a volume of the metric data output from the data sources is below a threshold.

21. A computer-readable medium encoded with machine-readable instructions that implement a method carried out by one or more processors of a computer system to perform the operations of
   receiving a query at a master node about use of computational resources of the computing environment;
   distributing metric data generated by data sources in the computing environment to one or more worker nodes, the metric data represents use of the computational resources;
   each worker node performs the following:
      receiving the query from the master node,
      generating worker-node data that represents the metric data received by the worker node in response to the query, and
      sending the worker-node data to the master node; and
   calculating at the master node a master-data structure that represents a distribution of the metric data over data-structure intervals based on the worker-node data sent from the worker nodes.

22. The medium of claim 21 further comprises calculating estimated percentiles from the master-data structure based on the query.

23. The medium of claim 21, wherein distributing the metric data further comprises:
   generating the metric data at data sources of the computing environment that use the computational resources;
   partitioning the metric data into two or more unique subsets of the metric data; and
   sending a unique subset of the metric data to each of the two or more worker nodes.

24. The medium of claim 21, wherein generating the worker-node data that represents the metric data received by the worker node further comprises when data size of the metric data received by the worker node is less than or equal to a memory bound of the worker node, the worker-node data is an array of the metric data.

25. The medium of claim 21, wherein generating the worker-node data that represents the metric data received by the worker node further comprises when the data size of the metric data is greater than the memory bound of the worker node, generating a data structure that represents a distribution of the metric data received by the worker, the worker-node data is the data structure.

26. The medium of claim 25, wherein generating the data structure that represents the distribution of the metric data further comprises:
   estimating a minimum-metric value and a maximum-metric value for the subset of metric data received by the worker node;
   forming data-structure intervals that combined cover values of the metric data;
   identifying data-structure intervals the estimated minimum-metric value and the estimated maximum-metric value are in;
   calculating an interval degree D based on the number of data-structure intervals and a number of intervals between and including the data-structure intervals that contain the estimated minimum-metric value and the estimated maximum-metric value; and
   counting each metric value of the metric data that lies in the data-structure intervals to form a frequency distribution the metric data over the data-structure intervals.

27. The medium of claim 26, further comprises:
   when the interval degree D is greater than or equal to one, splitting each of the data-structure intervals into $2^D$ data-structure subintervals; and
   counting each metric value of the metric data that lies in the data-structure subintervals to form a frequency distribution the metric data over the data-structure subintervals.

28. The medium of claim 21, wherein calculating the master-data structure further comprises:
   initializing current data as first worker-node data received; and for each worker-node data received after the first worker-node data,
combining the worker-node data with the current data to update current data, the current data being the master-data structure when worker nodes have finished.

29. The medium of claim 28, wherein combining the worker-node data with the current data to update the current data further comprises:
when current data and the worker-node data are metric data, combining current data and worker-node data to update current data;
when current data is metric data and the worker-node data is a data structure, converting the current data to a data structure and aggregating the current data with the worker-node data;
when current data is a data structure and the worker-node data is metric data, converting the worker-node data to a data structure and aggregating the current data with the worker-node data; and
when current data and the worker-node data are data structures, aggregating the current data with the worker-node data.

30. The medium of claim 21, wherein a single worker node operates at the master node when a volume of the metric data output from the data sources is below a threshold.

* * * * *